US006872918B2

(12) United States Patent
Toll

(10) Patent No.: US 6,872,918 B2
(45) Date of Patent: Mar. 29, 2005

(54) MULTIPLE ZONE AUTOCLAVES

(75) Inventor: Ian Cecil Toll, Dorset (GB)

(73) Assignee: Aeroform Group PLC, Dorset (GB)

( * ) Notice: Subject to any disclaimer, the term of this patent is extended or adjusted under 35 U.S.C. 154(b) by 98 days.

(21) Appl. No.: 10/290,755

(22) Filed: Nov. 8, 2002

(65) Prior Publication Data

US 2003/0085219 A1 May 8, 2003

(30) Foreign Application Priority Data

Nov. 8, 2001 (GB) .............................................. 0126837

(51) Int. Cl.⁷ .............................. F27B 5/04; F27D 7/04
(52) U.S. Cl. ......................... 219/400; 165/64; 373/111
(58) Field of Search ................................. 219/390, 400; 373/110–113; 165/61, 64

(56) References Cited

U.S. PATENT DOCUMENTS

| 4,188,811 A |   | 2/1980  | Brimm et al. ................. 72/63 |
|-------------|---|---------|--------------------------------------|
| 4,269,805 A |   | 5/1981  | Schoengen et al. ......... 422/106  |
| 4,426,793 A | * | 1/1984  | Kuboyama .................. 219/400  |
| 4,447,402 A |   | 5/1984  | Cox ............................ 422/174  |
| 4,576,792 A | * | 3/1986  | Martensson ................. 422/27   |
| 4,974,663 A | * | 12/1990 | Nakaji ........................ 432/152  |
| 5,345,799 A |   | 9/1994  | Miodushevski et al. ....... 72/19   |
| 6,240,333 B1|   | 5/2001  | McGee et al. ............... 700/207 |
| 6,264,771 B1|   | 7/2001  | Bornschlegl et al. ....... 148/710  |

FOREIGN PATENT DOCUMENTS

| CH | 227794     |   | 7/1943  |             |
|----|------------|---|---------|-------------|
| DE | 2637033 A1 | * | 2/1978  |             |
| EP | 0138688 A2 | * | 4/1985  |             |
| EP | 0333389 A1 |   | 9/1989  | ........... B29B/13/02 |
| EP | 0176508    |   | 10/1989 | ........... B29C/71/02 |
| EP | 0333389 B1 |   | 1/1995  | ........... B29B/13/02 |
| EP | 0830892 A1 |   | 3/1996  |             |
| GB | 1034722    |   | 7/1966  |             |
| JP | 58-62018   |   | 4/1983  | ........... B29D/3/02  |
| JP | 05-245361  |   | 9/1993  | ........... B01J/3/04  |
| JP | 05329355 A | * | 12/1993 |             |
| JP | 06-170209 A| * | 6/1994  |             |
| JP | 9251981 A  |   | 9/1997  |             |

OTHER PUBLICATIONS

International Search Report associated with PCT/GB02/05064.

* cited by examiner

Primary Examiner—Joseph Pelham
(74) Attorney, Agent, or Firm—Schwegman, Lundberg & Woessner & Kluth, P.A.

(57) ABSTRACT

An autoclave is provided for heat treatment of a load whose position relative to the autoclave, whose cross-section and/or whose thermal characteristics may vary along the load, e.g. large panels for an airliner. The autoclave comprises a chamber for receiving the load, a wall of said chamber providing one end thereof and a door providing the other end of the chamber and giving access for insertion and removal of the load. Means is provided for heating gas in the chamber, and a plurality of gas circulation means are provided spaced along the length of the autoclave and each producing a zone for circulation of heating gas. Means is provided for independent control of the rate of heat transfer between the heating gas and the load in said zones and said gas circulation means is arranged to produce a pattern of circulation in which heating gas impinges non-axially onto the load.

57 Claims, 15 Drawing Sheets

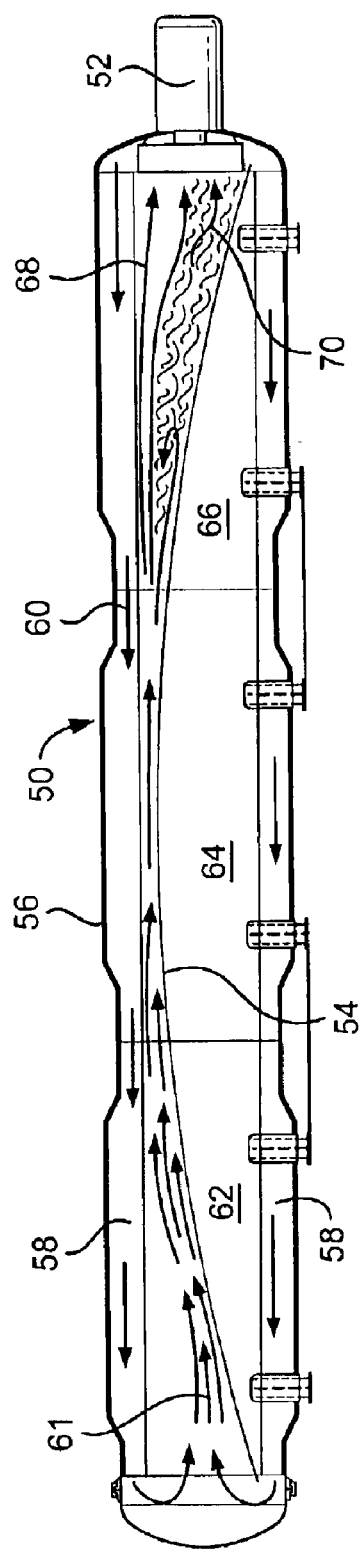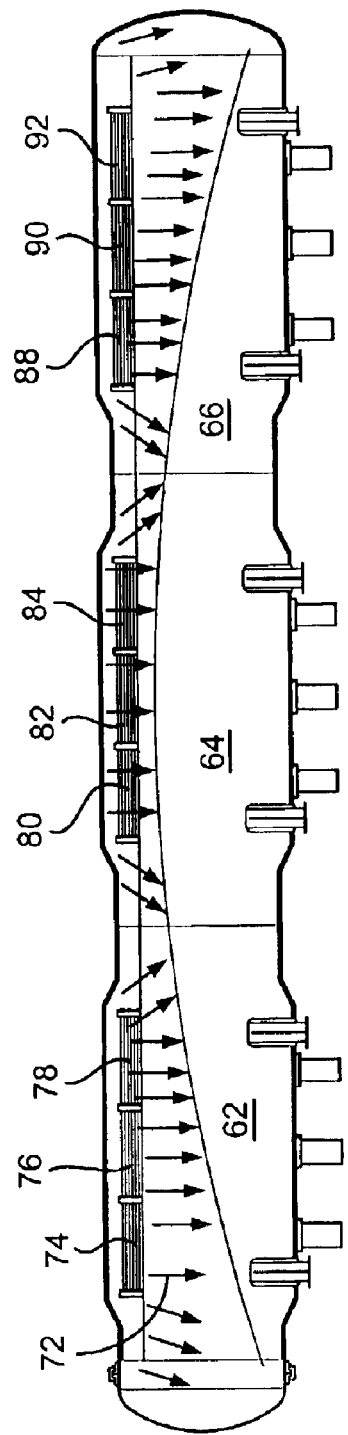

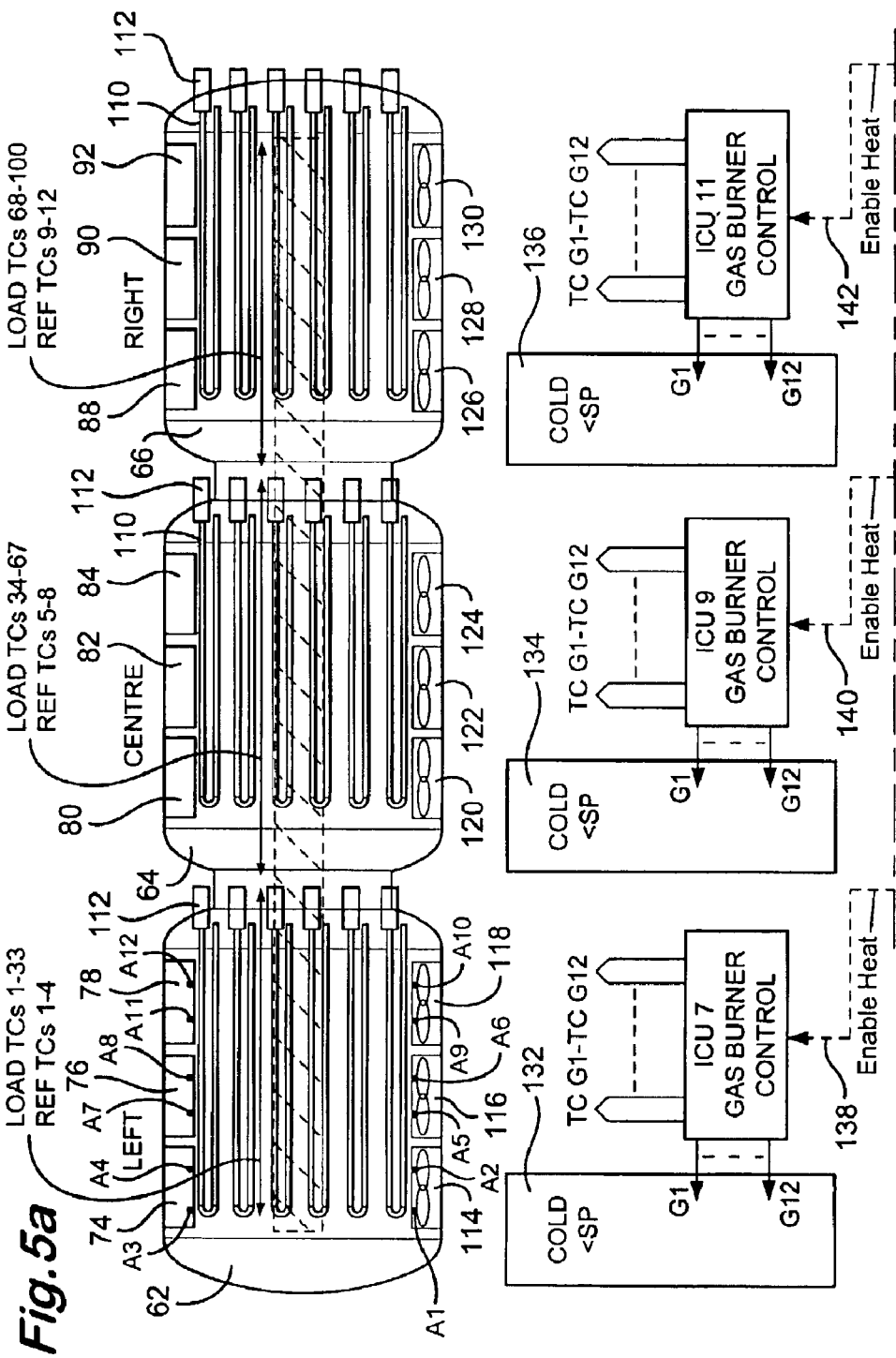

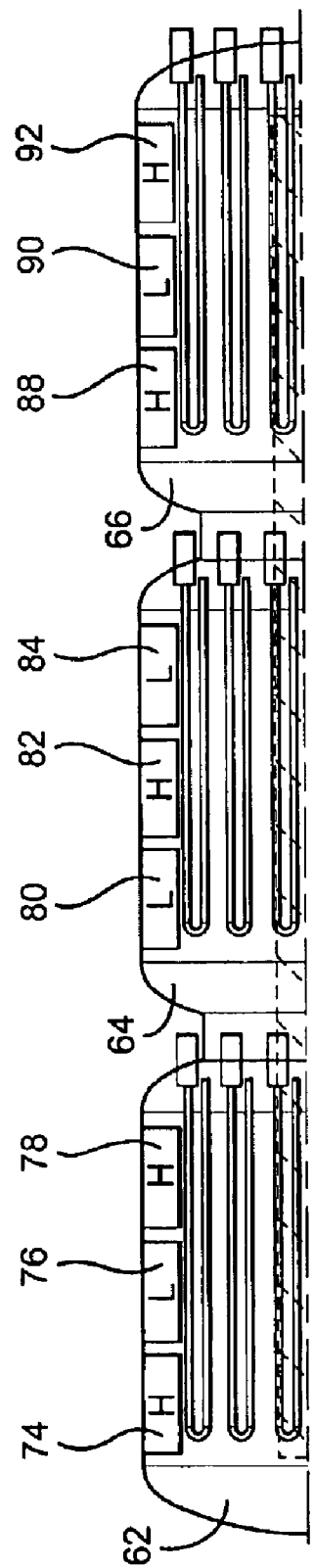
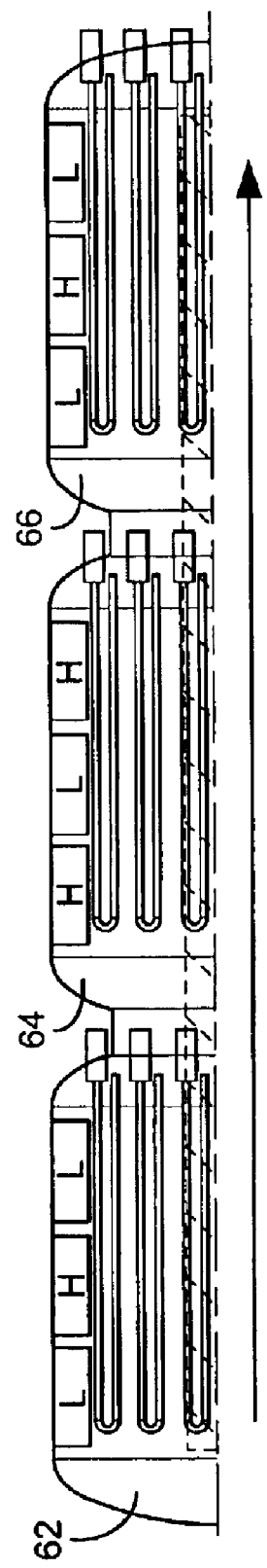
Fig. 7a
Fig. 7b

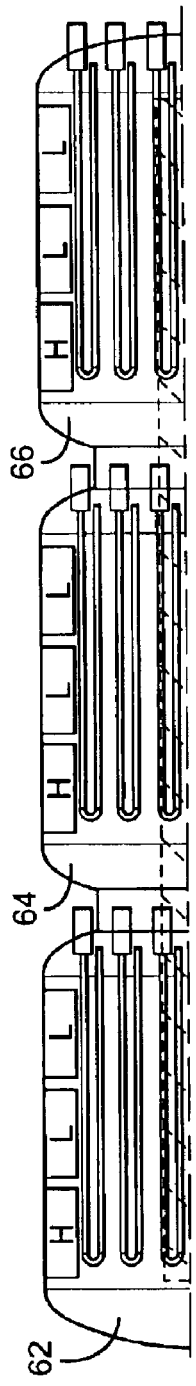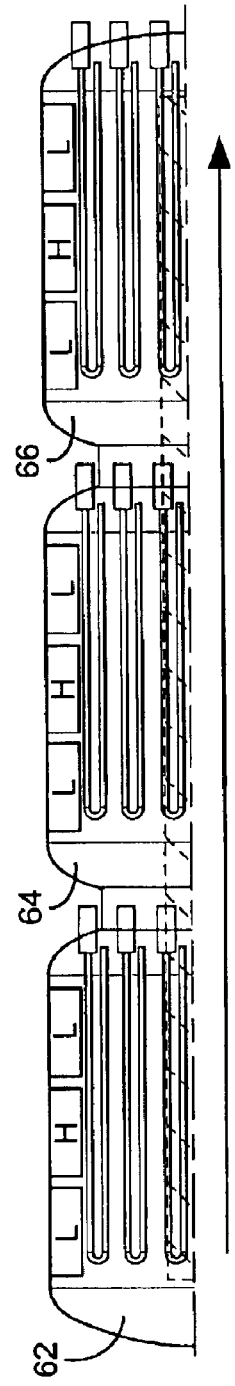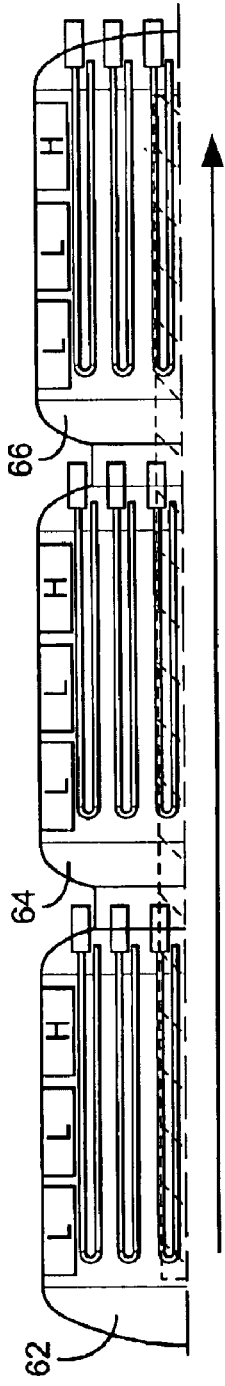

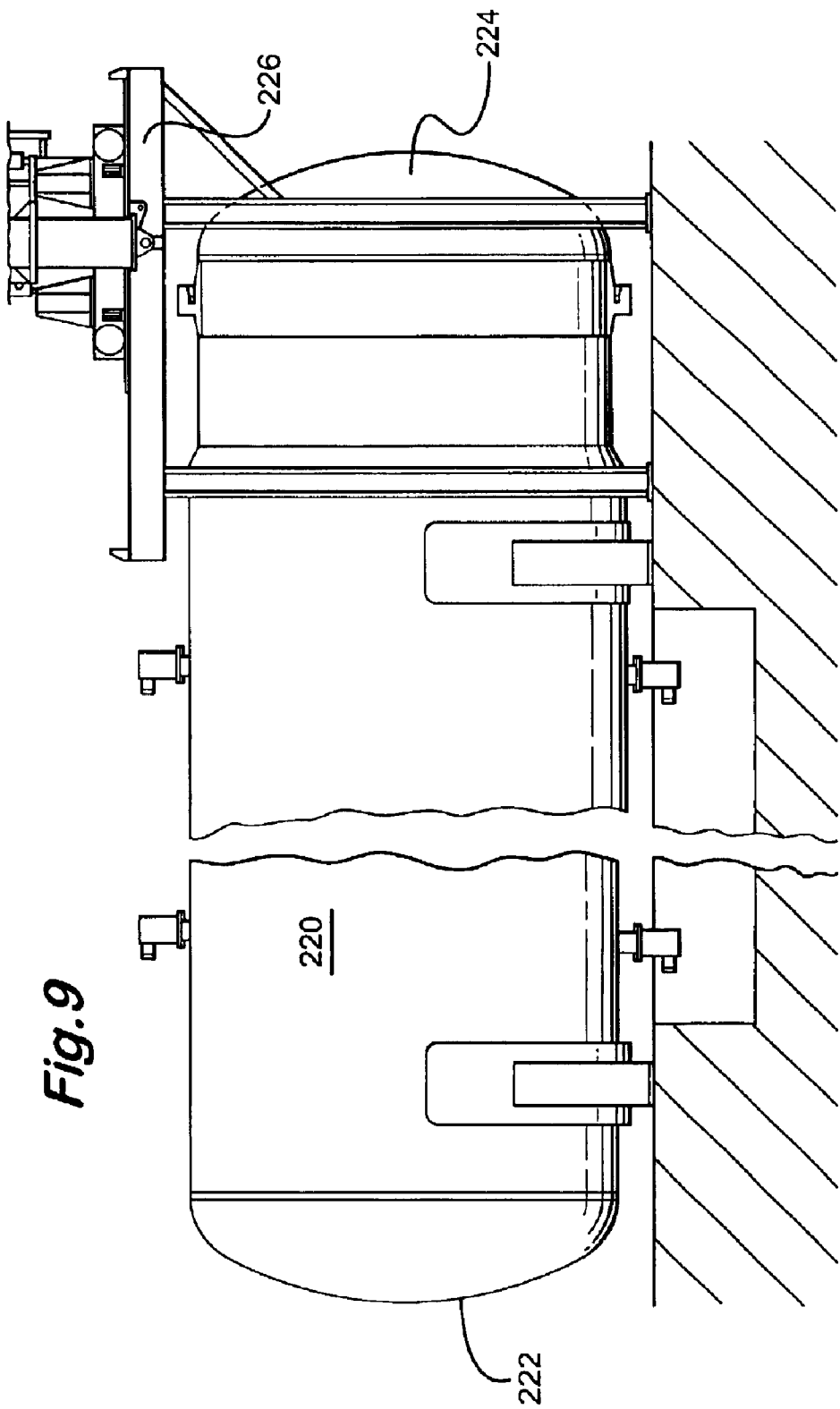

MULTIPLE ZONE AUTOCLAVES

CROSS-REFERENCE TO RELATED APPLICATIONS

This application claims priority from United Kingdom Application No. 01268374, filed Nov. 8, 2001, which application is incorporated herein by reference.

FIELD OF THE INVENTION

The present invention relates to autoclaves and to their use in the heat treatment of workpieces.

BACKGROUND TO THE INVENTION

EP-B-0176508 discloses a design for a gas-fired autoclave which is useful e.g. in the production of articles from fiber/resin mixtures and heat treatment of workpieces in the glass, automotive and aerospace industries and which nowadays typically have working temperatures of up to 450° C. and working pressures of up to 68 Bar. Autoclaves for use in curing composites or heat-treating glass articles might typically have a length of 3–4 meters, a diameter of 1–3 meters and a volume of 10–20 $m^3$. For use in the automotive industry e.g. for heat treating the chassis of a racing car an autoclave may typically have a diameter of about 2.75 meters with a length of about 4.5 meters and an internal volume of about 25 $m^3$. For use in the heat treatment of aerospace components, an autoclave might typically have a diameter of about 4.25 meters, a diameter of about 12 meters and a volume of about 170 $m^3$.

As shown in FIG. 1, a typical prior art autoclave is based on a pressure vessel that has a length of about 3.7 meters (12 feet) and a diameter of about 1.5 meters (5 feet), the vessel having a body 10 and a loading door 12. Vacuum lines 14 are provided for connection to the mold side of a mold tool (not shown) that is covered by a flexible diaphragm with a workpiece to be molded located between the tool and the diaphragm. The tool is connectable through valve 18 to vacuum and through valve 20 to air. Valve 22 can be operated to admit air through pressure lines 16 to the interior of the pressure vessel. Heating is by exposed radiant tubes 24 that run up and down the length of the pressure vessel. The entry to each tube is provided with a gas-fired heater 34 and the discharge end of each tube is provided with an impeller 36 by which a negative pressure is produced towards the discharge end and a flow of flue gas is maintained through the tube. A motor 38 mounted on the tank end wall drives a radial flow impeller 40 to produce a re-circulating flow of the gas within the pressure vessel. Thermocouples 42 through the tank wall 10 responsive to gas temperature are connected to a control unit 44 that is operatively connected to the various heaters to turn them off or on and maintain the gaseous atmosphere within the autoclave at ±1° of an intended value. The use of a variable speed impeller to enable the same tubes to be used for heating and for return to room temperature during the cooling part of the operating cycle is disclosed in EP-A-0333389. Autoclaves of other designs may be electrically heated, steam heated, oil-heated, hot air heated or gas radiant-heated, but up to now they have relied on an impeller in the end wall to produce a single generally axial pattern of re-circulating gas flow as indicated by the arrows in FIG. 1.

U.S. Pat. No. 6,240,333 (Lockheed-Martin) concerns the fabrication of composite parts in an autoclave. Lockheed-Martin explain that the F22 Raptor is an example of an aircraft made largely from composite materials formed with flexible graphite fibres, called a ply, that are impregnated with epoxy or BMI resins which harden when subjected to the application of heat. The uncured plies are placed on tools, each tool corresponding to a composite part of the Raptor. Thus, when the graphite resin mixture hardens over the tool, the composite part is formed with the proper shape. Lockheed-Martin go on to explain that a number of production techniques are available for forming composite parts. Again, using the Raptor as an example, once the plies are placed over the tool, a vacuum bag is used to hold the plies securely to the tool during curing of the resin. The vacuum bag forces the material to the tool and prevents the formation of bubbles and other material deformities. The tools are then placed in an autoclave for heating according to a schedule, adherence to which may be essential in order to avoid the production of defective parts.

Lockheed-Martin further explain that an autoclave operator must carefully distribute tools in the heating chamber of the autoclave to ensure that heating rate specifications are met, a typical autoclave being 15 metres (50 feet) long but nevertheless still being heated by blowing air with a large fan located at one end of the heating chamber. They identify a number of difficulties that this method of heating introduces into the production process, amongst others that if an autoclave operator adjusts heating rates to a lower level in order to avoid over-heating of a part, the autoclave will require a greater time to cure other parts, increasing the time required for the entire production run, and that if the parts are distributed improperly, the autoclave operator may have to violate the heating rate specifications for some of the tools, thus wasting the parts on those tools, in order to obtain useful parts from other tools. The solution suggested by Lockheed-Martin is to provide load distribution software for appropriate positioning of workpieces within a load to be introduced into the autoclave. The software includes a layout engine for determining the best layout of selected tools in an autoclave heating container depending upon (a) the particular tools selected, (b) the thermal performance of the tools and (c) the thermal characteristics of the autoclave, the layout engine generating the resulting pattern on a graphical user interface. The layout pattern is determined depending on:

Thermal response of the tools stored in a database.

Radial and axial variance in autoclave heating, the slow responding tools being laid out in regions of high heating and the fast responding tools being located in regions of low heating.

Uniform airflow around the load.

Feasibility of loading in the indicated pattern.

However, Lockheed-Martin give no detailed directions about how a layout engine should be written and what calculations it should perform, particularly as regards uniformity of airflow.

SUMMARY OF THE INVENTION

The present invention is based on the premise that in order to be in a position to treat loads that differ in mass, shape and cross-section along their length and to improve the chance that the whole load can receive the intended heat treatment, it is inherently better to modify the characteristics of an autoclave to take account of the characteristics of the load rather than to accept whatever characteristics the autoclave happens to have and modify the characteristics of the load.

One problem that arises when complex loads are heat treated in autoclaves is that at different positions along the autoclave there may be differences in the relative position or the cross-section of the load, said differences in an autoclave with axial gas circulation changing the speed of the circulating gas and hence of heat transfer to the load.

That problem is solved according to the invention by a method of heat treating a load as aforesaid in an autoclave, which method includes circulating heated gas within the load space by a plurality of gas circulation means spaced along its length and each causing the heated gas to circulate generally non-axially of the load space and/or to impinge non-axially onto the load.

Thus the invention may comprise an autoclave for heat-treating a load, said autoclave comprising:

a shell defining a pressurizable heating chamber;

means within the shell defining a load space;

at least one door for closure of the heating chamber and for permitting entry of loads into and discharge of loads from the load space;

means for heating the gas within the load space, and a plurality of impellers and respective driving means spaced apart at intervals along the heating chamber each for non-axial circulation of gas in a respective zones of said load space.

The invention further comprises an autoclave for heat treatment of a load whose position relative to the autoclave and/or whose cross-section may vary along the load, said autoclave comprising:

a chamber for receiving the load, said chamber having first and second ends and an axis that passes through said first and second ends, the wall of said chamber providing the first end;

a door providing the second end of the chamber and giving access for insertion and removal of the load;

means for heating gas in said chamber; and heated gas circulation means arranged to produce a pattern of circulation in which heating gas circulates generally non-axially of the load space and/or impinges non-axially onto the load.

Another problem that arises when complex loads are heat treated in autoclaves is that at different positions along the autoclave there may be differences in the thermal characteristics of the load, which in an autoclave with axial gas circulation may be difficult to overcome merely by adjusting the distribution of the load to take account of known or forecast differences in heat transfer rate with position.

That problem is solved according to the invention by a method of heat treating a load whose thermal characteristics vary with position along the load, which method comprises heating the load in an autoclave having a plurality of gas circulation means spaced along its length and each producing a zone for circulation of heating gas, the gas circulation in said zones being independently controllable. With this method, a load of variable geometry and mass can be heated at different temperatures along its length or at different speeds of gas circulation in order to raise the temperature of the mass as a whole at a uniform rate.

The invention further provides an autoclave or oven for heat treatment of a load whose thermal characteristics may vary along its length, said autoclave comprising:

a chamber for receiving the load, said chamber having first and second ends, the wall of said chamber providing the first end;

a door providing the second end of the chamber and giving access for insertion and removal of the load;

means for heating gas in said chamber; and a plurality of gas circulation means spaced along the length of the autoclave and each producing a zone for circulation of heating gas, the gas circulation in said zones being independently controllable.

The aforesaid problems are not mutually exclusive, and indeed will commonly occur together.

Thus in a further aspect the invention provides an autoclave for heat treatment of a load whose position relative to the autoclave, whose cross-section and/or whose thermal characteristics may vary along the load, said autoclave comprising:

a chamber for receiving the load, said chamber having first and second ends and an axis that passes through said first and second ends, the wall of said chamber providing the first end;

a door providing the second end of the chamber and giving access for insertion and removal of the load;

means for heating gas in said chamber; and a plurality of gas circulation means spaced along the length of the autoclave and each producing a zone for circulation of heating gas, the gas circulation in said zones being independently controllable and said gas circulation means being arranged to produce a pattern of circulation in which heating gas impinges non-axially onto the load.

DESCRIPTION OF PREFERRED FEATURES

The above autoclave is divided longitudinally into a sequence of treatment zones, and preferably the means for controlling the rate of heat transfer between the heating gas and the load in each zone comprises an impeller. It has been found that the impeller can provide a dual function: firstly adjusting the speed of the circulating gas and hence the coefficient of heat transfer to the load and secondly acting as a source of heat for the heating gas because of the high power input which is required in practice to produce gas circulation at the required velocity or mass flow, especially at the typical working pressures of 5–25 bar found in the autoclave, means preferably being provided for independently adjusting the friction heat generated in said heating gas by the impeller of each treatment zone. It has been found in practice that providing one or more thermocouples in the autoclave measuring gas temperature and load temperature and using a difference between measured and required temperatures to generate a difference signals to adjust the impeller speeds and hence the amount of friction heat that the impellers generate provides fine temperature control and can enable load temperatures of ±1° C. to be achieved during the load heating phase of the autoclave processing cycle. The means for controlling the rate of heat transfer between the heating gas and the load in each zone preferably also comprises cooling means for cooling gas circulating in said zone. The ability to adjust the rate of gas flow in zones along the length of the autoclave and optionally in different regions within a single zone is of particular value during the cooling part of a treatment cycle in order to take account of differences in gas flow path around different regions along the load and also differences in the heat capacities of tool and workpiece at different regions along the load. The provision of independent adjustments for primary heat zone-wise or in a group of zones, mass flow rate in each zone, friction heat generation in each zone and cooling in each zone enables a high degree of stability to be achieved.

As regards heating the circulating gas, electricity is one possible heat source, in which case it is convenient to provide an independent heater for heating gas circulating in each zone. In the case of gas, steam or oil heating e.g. using radiant tubes, the heating means may comprise at least a first heater that is common to a group of zones and typically at least first and second heaters for first and second groups of zones. Control means may be adapted to create differential conditions in at least one zone in a time-varying pattern, thereby to transfer gas axially between zones.

The pattern of gas circulation is non-axial and is transverse to the axis or longitudinal dimension of the load space which typically has an aspect ratio greater than one. Means are preferably provided in each zone for establishing a circumferential bilobal circulation of gas, the plane of said circumferential bilobal circulation being generally at right angles to said longitudinal direction or axis. In order to achieve such a circulation pattern, the autoclave may further comprise spaced oppositely facing inner wall portions defining with a side wall of the chamber spaces for flow of gas along the circumference of said chamber, a first aperture defined between said inner wall portions for entry of gas into said flow spaces, and a second aperture defined between said inner wall portions opposite the first aperture for gas leaving the flow spaces and flowing through said chamber towards the first aperture. In order to increase the mass flow of heated gas traveling over the load and hence the coefficient of heat transfer, it is preferred to provide means for reducing the volume of gas above the load and hence increasing the speed of the gas. For this purpose at least one gas deflection means is preferably provided in said autoclave for varying the velocity of gas adjacent to the load, and actuator means is preferably connected to the gas deflection means for adjustment of the position thereof from the exterior of said chamber.

The above autoclave may be used for heat treating an elongated article with its longest dimension directed generally parallel to the axis of the autoclave, and the heat treatment is carried out so as to heat the article according to a predetermined pattern, usually so that it rises in temperature evenly along its length. The article may be non-linear in its longitudinal direction e.g. a panel for an aircraft wing having both longitudinal and transverse curvature.

Typically the load comprises articles each consisting of a workpiece in contact with a tool, the workpiece being heat treated and being shaped by contact with the tool as in the forming of composites by a combination of evacuation of the interface between the composite and the forming tool and application of pressure of the hot gaseous atmosphere within the autoclave. The autoclave has as one of its main uses the treatment of a single workpiece and a single forming tool extending along a major part of the internal space of the autoclave. It can also be used for the het treatment of a plurality of workpieces and forming tools extending in side-by-side relationship along a major portion of the internal space of the autoclave. It may also be used for the heat treatment of a plurality of workpieces and forming tools disposed end to end in series along the internal space. Use of an autoclave to make shaped parts is not limited to the production of parts in curable plastics or composite materials, but also includes parts made in metal that are required to undergo a heat treatment to change their shape or improve their properties.

Age creep forming is a process that can be used for forming metallic plates into a desired contoured shape, for example to give an aluminium or alloy wing panel its aerofoil shape. The practical steps involved in age creep forming are closely analogous to those involved in moulding a curable composition. Following machining, a metal panel is placed onto a mould and covered with a sheet of a plastics material that resists high temperatures. The assembly is placed in an autoclave, the air beneath the sheet is evacuated and the interior of the autoclave is pressurised, forcing the panel tightly onto the mould, and the autoclave is heated e.g. to about 220° C. After a period of e.g. 24 hours the panel is cooled to room temperature and removed from the autoclave. U.S. Pat. No. 4,188,811 (Chem-tronics) discloses a process for shaping a metallic workpiece that uses a single-faced die and the use of heat and pressure to conform the workpiece to the shape of the die surface by creep forming. In particular, the patent discloses a process for altering the shape of a metallic workpiece which comprises the steps of: placing the workpiece on the face of a die which face has a configuration wanted in the workpiece and concurrently heating said workpiece and applying pressure thereto via a compliant body composed of discrete pieces of a heat resistant, pressure transmitting material and located on that side of the workpiece opposite the die, the temperature to which the workpiece is heated and the pressure applied thereto being so correlated as to cause the workpiece metal to flow plastically at a stress below its yield strength into contact with the face of said die to thereby impart the wanted configuration to the workpiece. More recent references to creep forming occur in U.S. Pat. Nos. 5,345,799 (Aliteco AG) and U.S. Pat. No. 6,264,771 (Bornschlegel).

As previously mentioned, one preferred gas circulation pattern within the zones of the autoclave is bilobal with a plane of bilobal circulation in each zone directed transversely of the axis of the autoclave, and wherein gas at a central region of said bilobal circulation impinges onto and/or passes through the tool. The tool advantageously has a gas-receiving opening that faces a location where gas that has been traveling along a circumferential part of its circulation path enters a central part of its circulation path in which the gas travels across the load space A second preferred gas circulation is tetra-lobal with first and second impellers disposed, when the autoclave is viewed in section, at the 0° and 180° positions and having discharge outlets defined by discontinuities in the inner load-space defining wall at the 90° and 270° positions so that first and second inward flows of heated air can be produced which can impinge on a workpiece from opposite directions.

BRIEF DESCRIPTION OF THE DRAWINGS

How the invention may be put into effect will now be described, by way of example only, with reference to the accompanying drawings, in which:

FIG. 2 is a simplified diagrammatic view in vertical section of an autoclave with air circulation from one end and with an elongated workpiece that is curved at least along its longitudinal direction;

FIG. 3 is a simplified diagrammatic view of an autoclave and workpiece similar to that in FIG. 2 except that an air circulation at least part of which is radial is produced by means of a series of impellers located at intervals along the autoclave;

FIGS. 5*a*–5*c* are upper, middle and lower portions of a diagram of the autoclave and its associated control systems;

FIGS. 7*a*–7*b* and 8*a*–8*c* are views of the autoclave of FIGS. 3 and 4*a*–4*h* showing schemes for the creation of pressure waves for bringing about movement of air axially from one zone to another;

FIGS. 9 and 10 are respectively a side elevation and a view in transverse section of a further autoclave according to the invention.

DETAILED DESCRIPTION OF PREFERRED EMBODIMENTS

Figure 1:
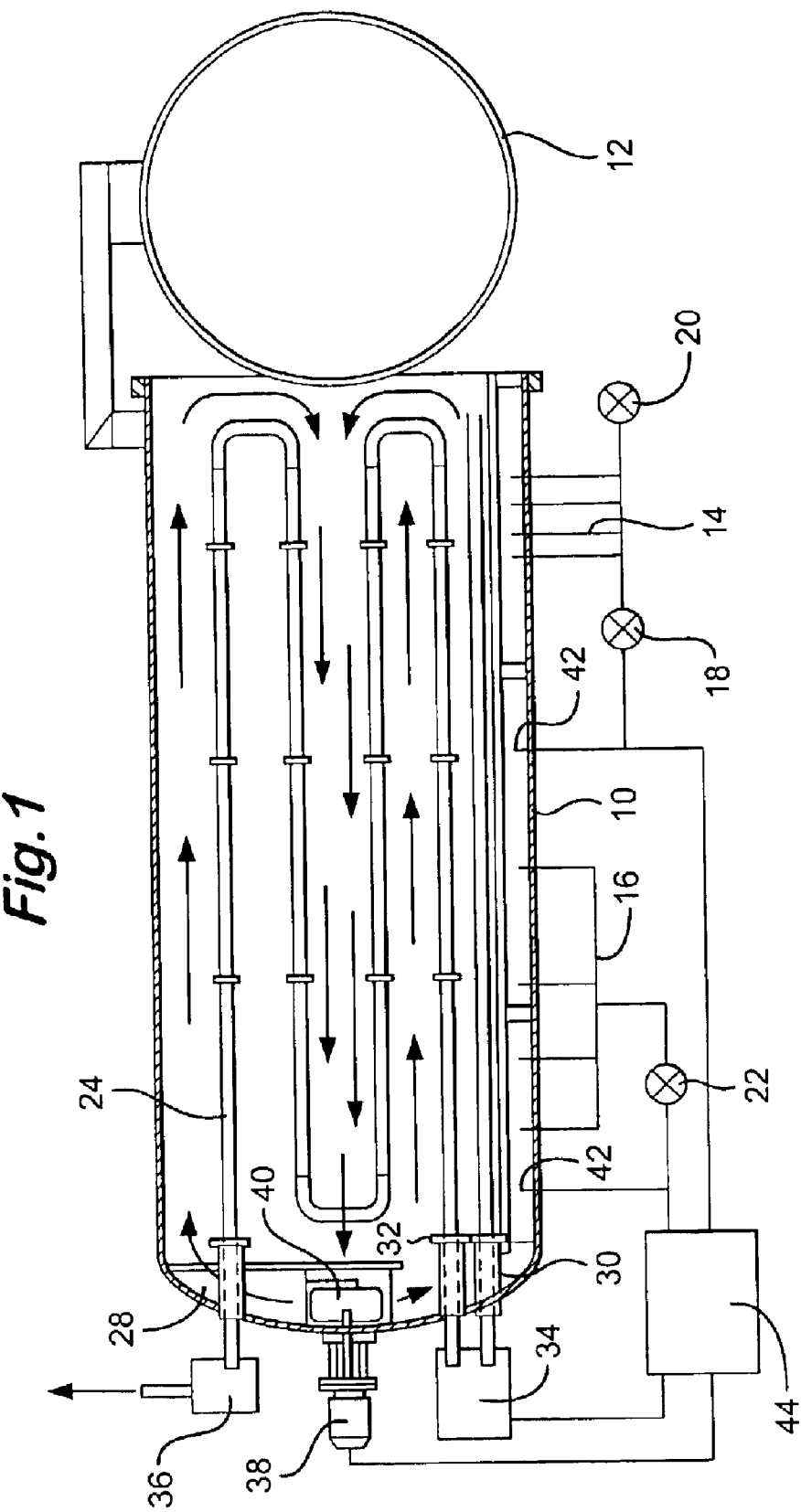
FIG. 1 is a simplified diagrammatic view in longitudinal vertical section of a known autoclave.

The present invention is particularly, though not exclusively applicable to autoclaves of high aspect ratio, high volume or both high volume and high aspect ratio. An autoclave of relatively small size but high aspect ratio might be used, for example, in the heat treatment or shaping of yacht masts and could have a length of e.g. 20 meters and a diameter of 1 meter, with an internal volume of about 12 m$^3$. In the case of both high volume and high aspect ratio, the autoclave may be 15 meters in length and in a typical installation may be about 35 meters in length, there being no specific upper limit in length because of the non-axial flow pattern that has been selected. The volume of the autoclave may be more than 250 cubic meters, often more than 500 cubic meters and in a typical installation more than 750 cubic meters. The aspect ratio of the load space within the autoclave (length to diameter or maximum transverse dimension) may be more than three, usually more than 5 and in a typical installation about 7.

The problems that arise when a component such as a panel for a large aircraft wing, said panel arising from where the wing joins the fuselage of the aircraft, is to be heat treated in a conventional autoclave 50 with axial air circulation via fan 52 are shown in FIG. 2. The wing panel 54 may be, for example, of aluminum alloy of section typically 40 mm towards its base and 4 mm towards its tip with curvature both transversely and longitudinally and with change of section gradually all along its length. Tooling of steel plate that is typically about 10 mm thick supports the panel 54 that is to be creep formed and the panel or workpiece is to be pulled down onto a datum surface defined by screw jacks distributed along and across the tool. The panel is covered by a rubber sheet and is pulled down onto the datum surface by vacuum and by the pressure of the gas within the autoclave, which will typically be at a pressure of up to 20 bar and up to 200° C.

For creep forming, a typical specification for the thermal regime to be undergone by the panel 54 is that it should be heated to ±2° C. of its target temperature and that the thickest part of the panel should achieve its target temperature within one hour of the thinnest part. Heat reaches the panel mainly by impingement of the heating gas on the rubber cover sheet, so that it is necessary to model convection in air, conduction through the rubber cover sheet and the thermal capacity of the aluminum panel.

In FIG. 2 the tooling is omitted for the sake of clarity. As apparent, gas flows axially away from fan 52 between the sidewall 56 of the autoclave and inner wall 58 as indicated by arrows 60 and returns inward to provide an axial return flow 62. Radiant tube heating elements (not shown) are provided between walls 56 and 58. The autoclave is formed in three segments, with a segment 62 furthest from the fan, a central segment 64 and a segment 66 nearest to the fan. In the segment 62 furthest from fan 52 the panel 54 is at a relatively wide spacing from inner wall 58 and gas flow is relatively slow. In the middle segment 64 the gap between panel 54 and inner wall 58 has narrowed and gas flow has accelerated with a corresponding increase in heat transfer coefficient. In the segment 66 nearest the fan 52 because of the reverse curvature of the panel 54, the heating gas no longer impinges directly on the rubber over-layer and instead part of it by-passes it to return directly to the fan as indicated by arrow 68, while the remainder becomes turbulent as indicated by arrows 70. In order to overcome the problems imposed by the differing gas flow regimes and consequential differences in load (workpiece and/or tool) heat transfer coefficient, the fan 52 has to produce a very high gas flow which is against a high static head resulting from the length of the flow paths and obstruction provided by the heaters in the outflow part of the path and the load in the return part of the path. Gas flow through the tooling does not contribute significantly to processing because the predominant gas flow is over the surface of the panel 54 as shown. Inevitably one end of the load is cooler than the other. MW of fan power is required, with high capital cost, and there is a zero diversity factor.

The invention overcomes these problems, as shown in FIG. 3 by providing a generally non-axial flow pattern of heating gas with gas circulating circumferentially between inner and outer walls of the autoclave where it can be heated by flow past radiant tubes and traveling across the load space so that the flow impinges onto the load, as indicated by arrows 72. The pattern of gas circulation in planes directed generally at right angles to the axis of the autoclave provides the opportunity to divide the load space into a multiplicity of processing zones in which gas flow (speed and temperature) is independently controllable to maintain uniform temperature of a load with diversity factors. In the present embodiment, circumferential flow for each segment is directed through and then downwardly from cooling units mounted at and spaced axially along the uppermost region of the autoclave, the cooling units being useful firstly for adjustment of the temperature of the circulating gas during a heating part of a treatment cycle and preventing overheating of a lightly-loaded or non-loaded region of the autoclave and secondly for assisting of return of temperature to ambient during a cooling part of the treatment cycle. Cooling units 74, 76 and 78 are provided in the segment 62, cooling units 80, 82 and 84 are provided in the segment 64 and cooling units 88, 90 and 92 are provided in the segment 66. The circumferential flow enters the cooling units and is then directed downwardly towards the load as shown. For the return part of the travel of the gas, impellers in matching units under the floor of the autoclave return gas from the load space for flow circumferentially between the walls 56, 58.

Use of a multiplicity of impellers located at intervals along the autoclave in addition to sharing the load gives rise to a reduced static head at each impeller, so that smaller motors can be used without compromising the air movement requirements of the autoclave. Smaller motors are easier to manufacture and install and provide improved control firstly because the transverse flow path or paths controlled by each motor is or are relatively short compared to the axial flow path of conventional autoclaves and because adjustment of impeller speed can be used not only to control mass flow but also to control the amount of friction heat imparted at each impeller which especially at relatively high autoclave internal pressures can provide a significant proportion of the thermal input. The motors preferably have a rated power output greater than that needed for gas circulation, so that additional power can be used for friction heating of the gas in the zone. Use of friction heating which may be important in the dwell part of the processing cycle is facilitated if the duty is shared by a plurality of motors and impellers located at intervals along the autoclave and not simply by a single motor in an end wall as in prior art autoclaves.

A cross-section of the autoclave of FIG. 3 is shown in FIGS. 4a–4h in which it is apparent that the autoclave has a side wall 56 and oppositely facing arcuate side walls 58, 58a defining with the wall 56 circumferential gas circulation spaces 95 containing gas-fired radiant heater tubes 96. As is apparent from FIG. 4a, each segment has six radiant tubes per side fired by six gas burners giving twelve radiant tubes and gas burners per segment. It will be appreciated that gas fired radiant tubes are only an example and that other forms of heating may be employed. A load space 98 is defined between the inner walls 58,58a, ceiling 100 and floor 102, the cooling units, in this case the unit 76 being ceiling-mounted and the impellers 104 being floor-mounted. Load 106 is present in the load space and takes the form of a panel to be formed and a forming tool with a blanket of deformable material or a rigid second part of the tool covering the panel and with means (not shown) for applying a vacuum under the panel to assist the forming operation.

Figure 4A:
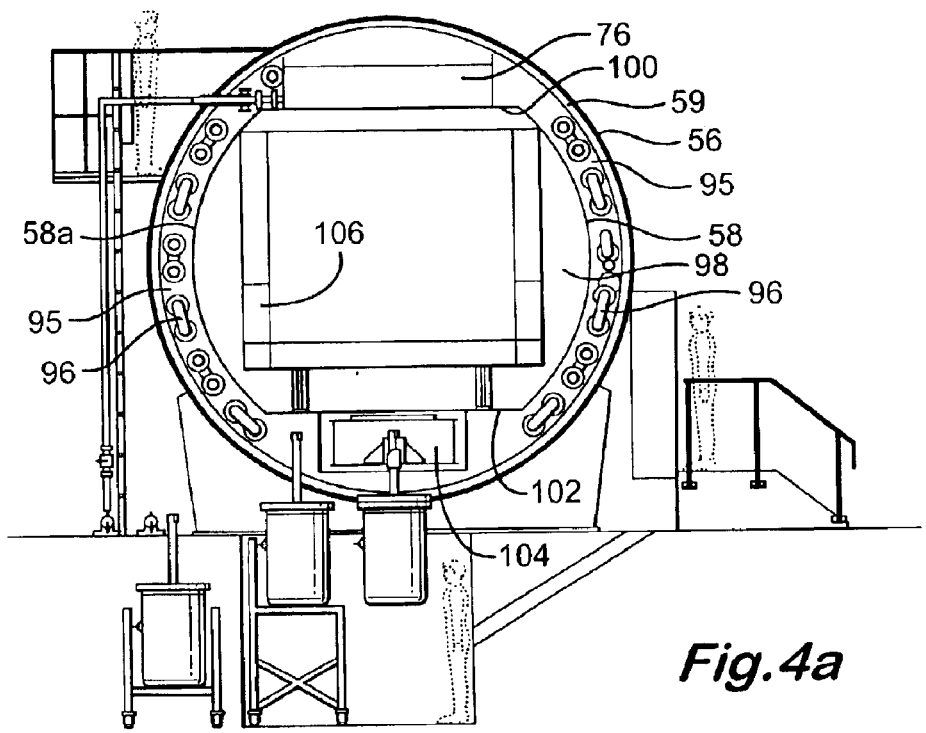
FIGS. 4*a*–4*h* are views of the autoclave in transverse section showing the pattern of air circulation.
Figure 4B:
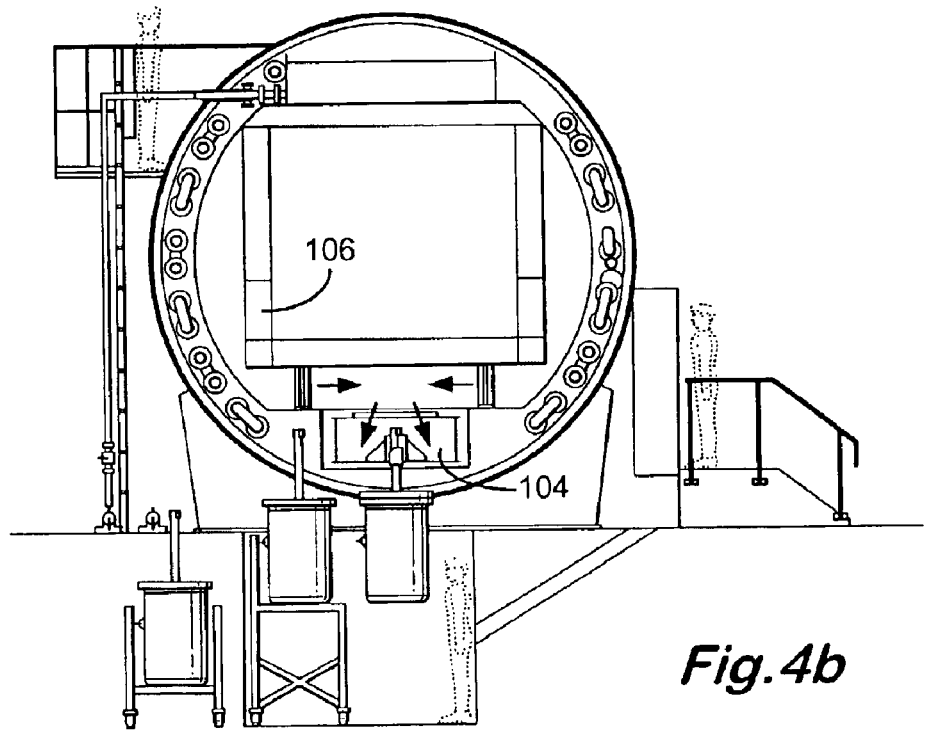
Figure 4C:
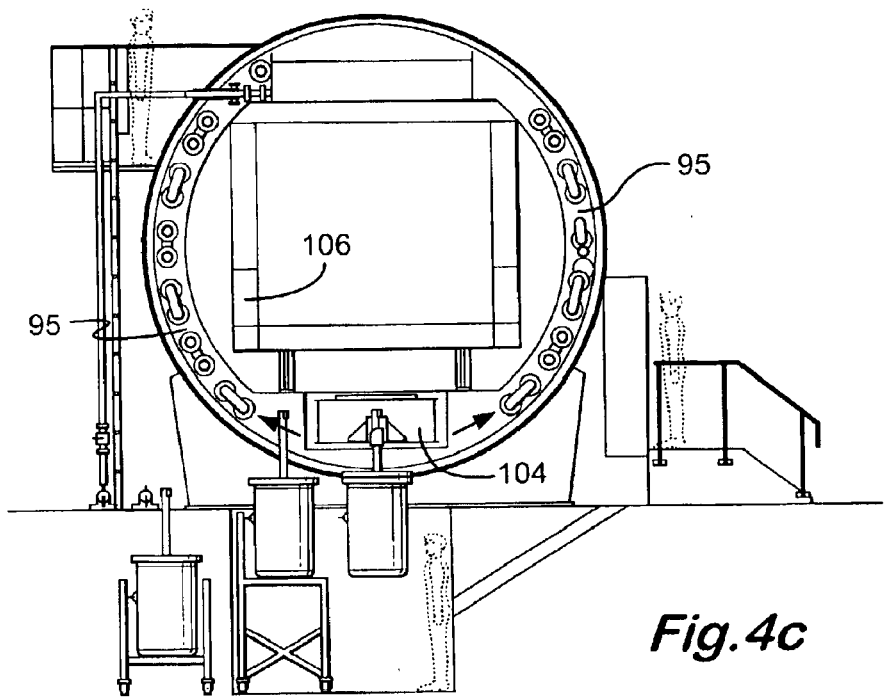
Figure 4D:
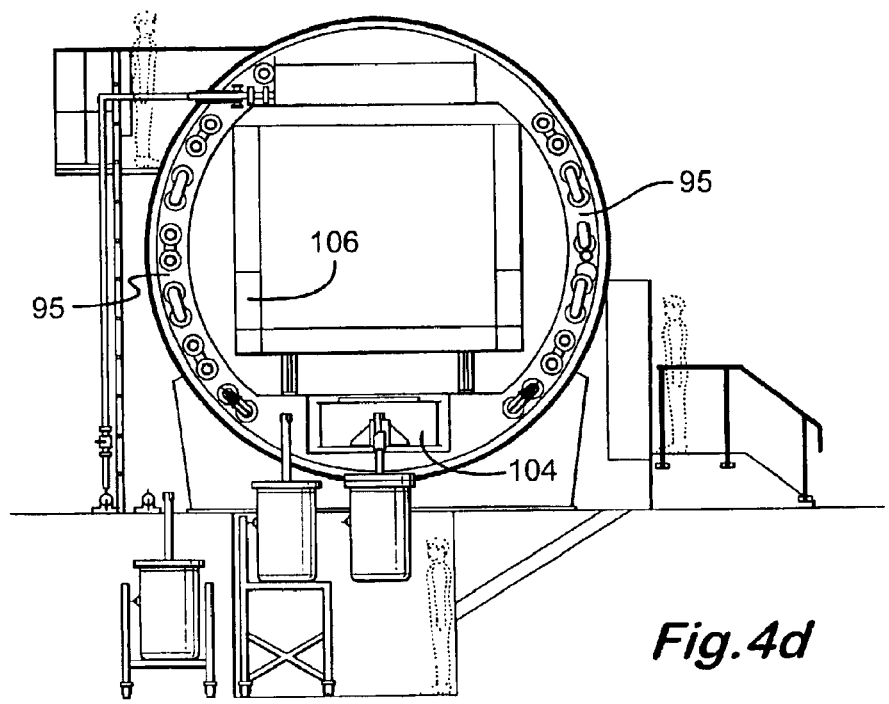
Figure 4E:
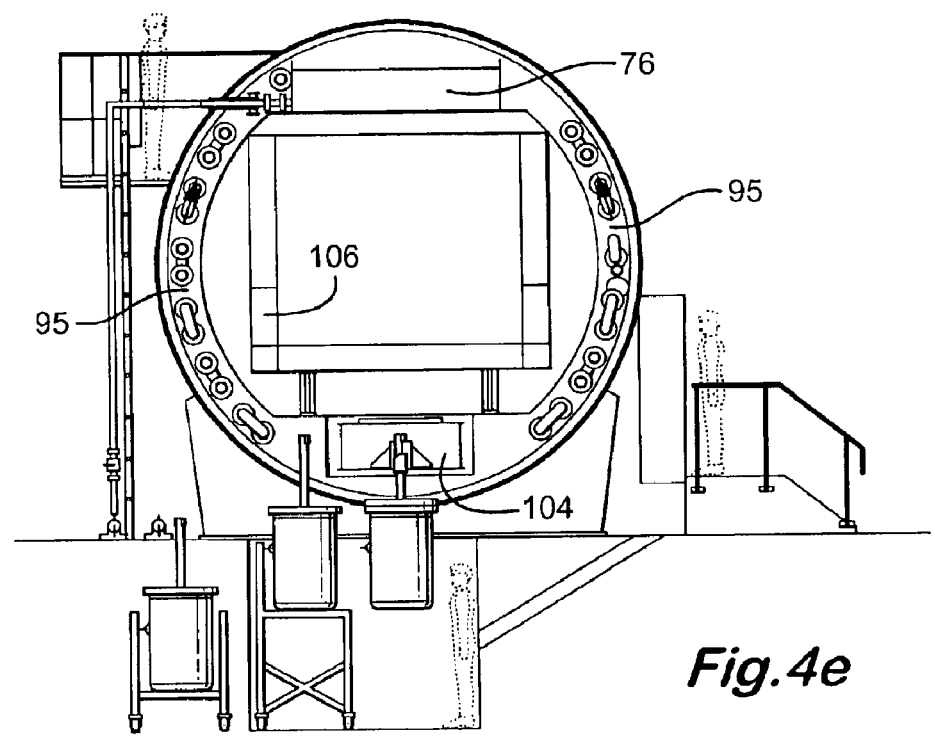
Figure 4F:
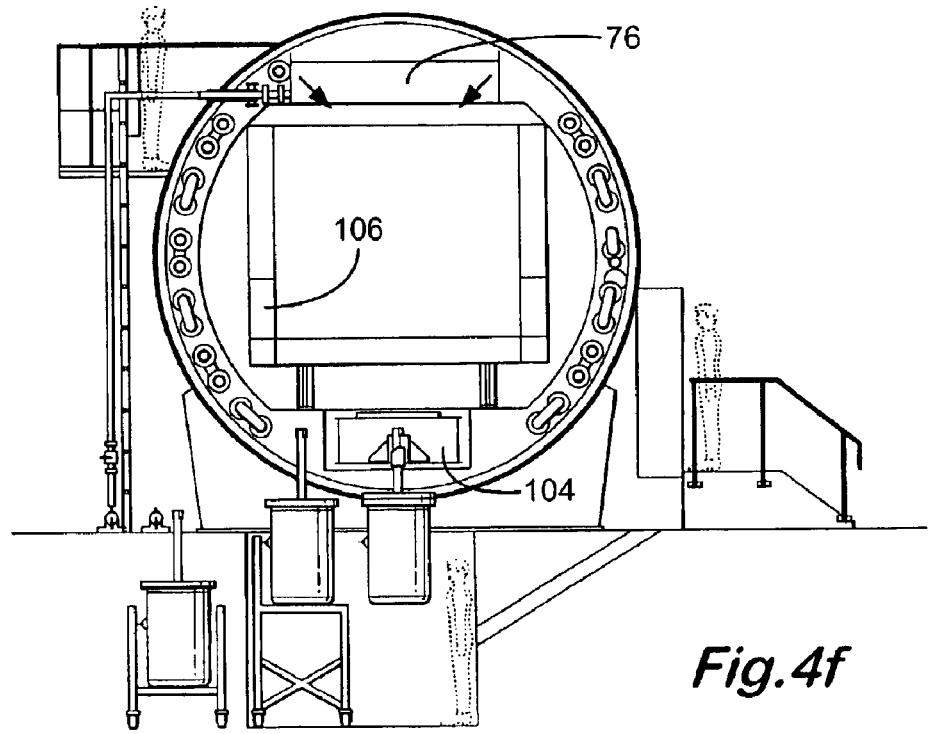
Figure 4G:
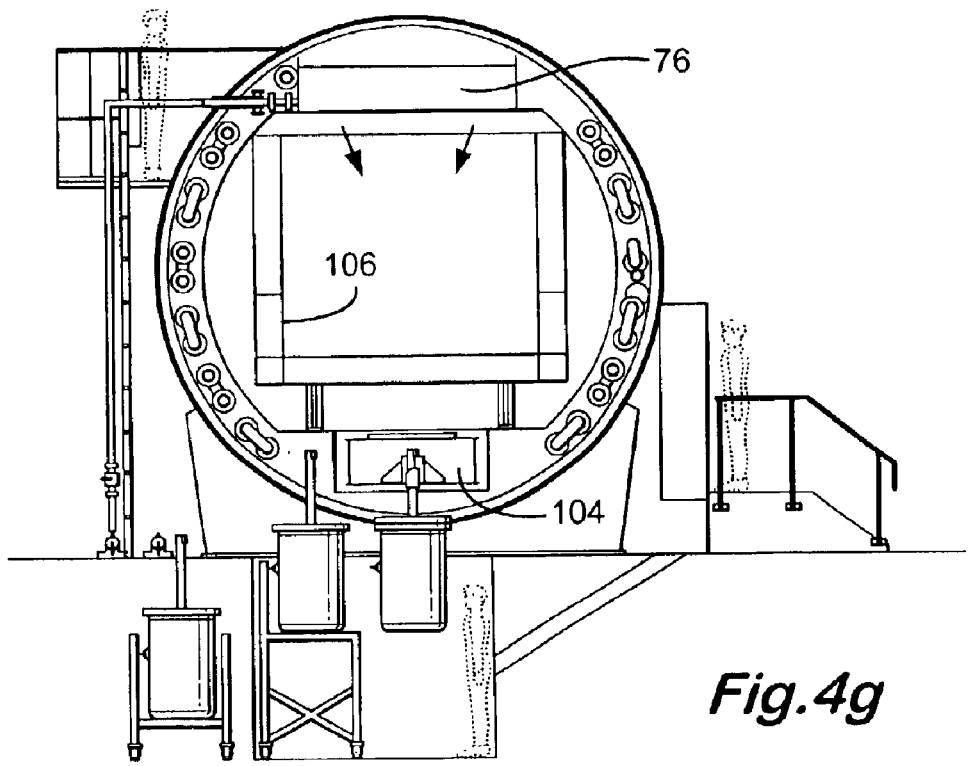
Figure 4H:
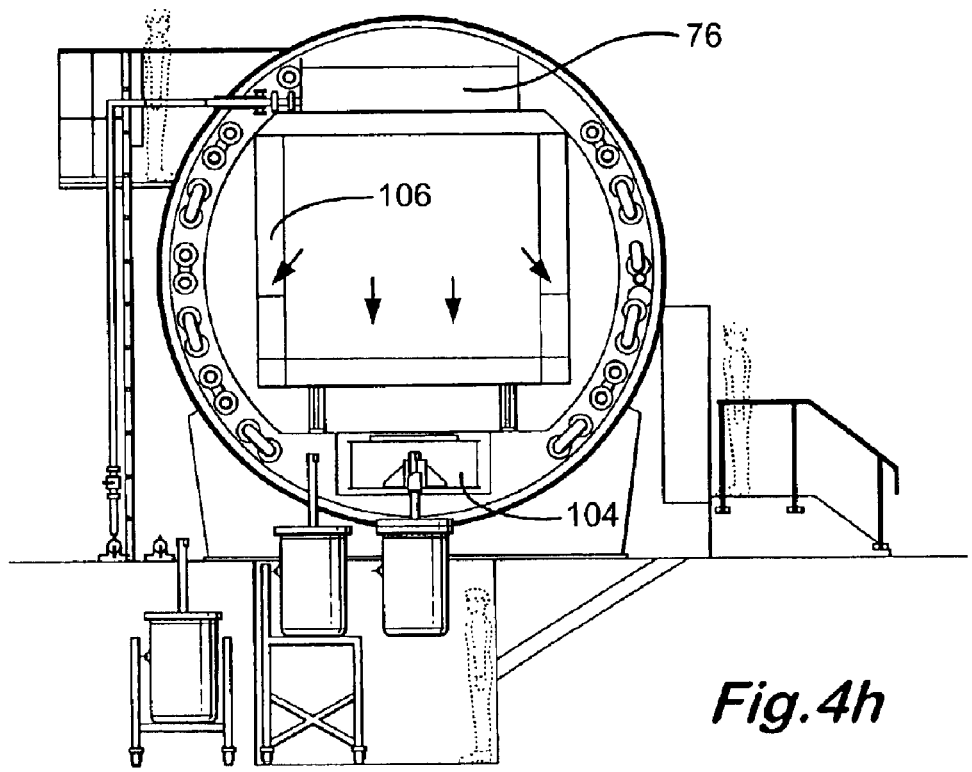

As shown by the arrows in successive figures, heating gas from the underside of the load 106 passes into the impeller or fan 104 (FIG. 4b), from which it is discharged towards gas circulation spaces 95 through which it flows circumferentially (FIGS. 4d, 4e), until it reaches the cooling unit 76. The impeller or fan will normally be a centrifugal fan having a casing, an inlet connected to an opening in the floor (in this embodiment) and having oppositely facing first and second outlets directed transversely of the autoclave. In this way the gas from the load space flows zone-wise through the surrounding space at opposite sides of the autoclave towards the respective cooling unit e.g. 76. The gas leaving the cooling unit passes downwardly onto or into and then through a forming tool that forms part of the load 106 (FIGS. 4f, 4g, 4h) before returning to the underside of the load (FIG. 4b). Accordingly there is established in each zone a circumferential bilobal circulation pattern, with the load being in a central region or load space where the gas flow from the two lobes becomes combined and where the gas travels transversely of the load space, in this case downwards and can impinge onto the tool to create a local turbulent heat-transferring flow pattern.

Internal lagging 59 of rockwool or other inert thermally resistant insulating material is provided as a lining to the outer shell of the autoclave to reduce heat transfer the autoclave shell during heating and hence the thermal stress on the shell, and also to reduce heat transfer from the shell back into the load space during the cooling phase of a treatment cycle. In this way the energy requirement for each cycle is closer to that required for heating and cooling the load or process mass and less energy goes into heating and cooling the total mass of the autoclave which includes the mass of the vessel or shell and its door or doors. Energy that goes into heating or cooling the autoclave shell during each treatment cycle is wasted energy and is desirably minimized. The arcuate side walls 58,58a, ceiling 100 and floor 102 form a continuous surface so that all the air flow from impeller 104 passes through the gas circulation space 95 to the cooling unit 76 and there are no air gaps which could give rise to overspill. The absence of air gaps is not critical and, for example, ports could be formed in the sidewalls 58, 58a to direct heated air onto particular regions of a workpiece and forming tool but this is less preferred because such ports are likely to be specific to a particular tool and workpiece, so that the autoclave would have to be set up specifically for each job.

Figure 5B:
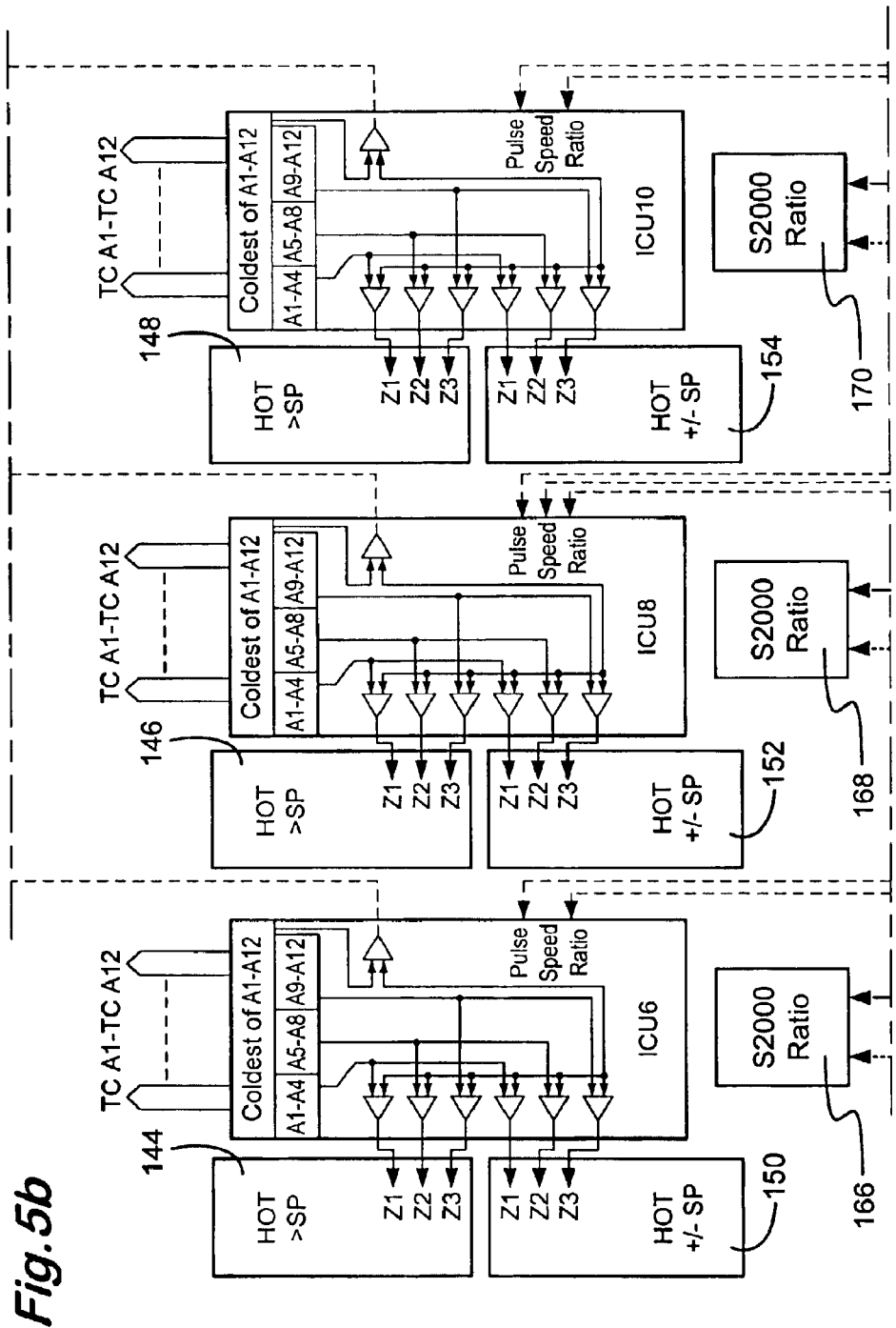
Figure 5C:
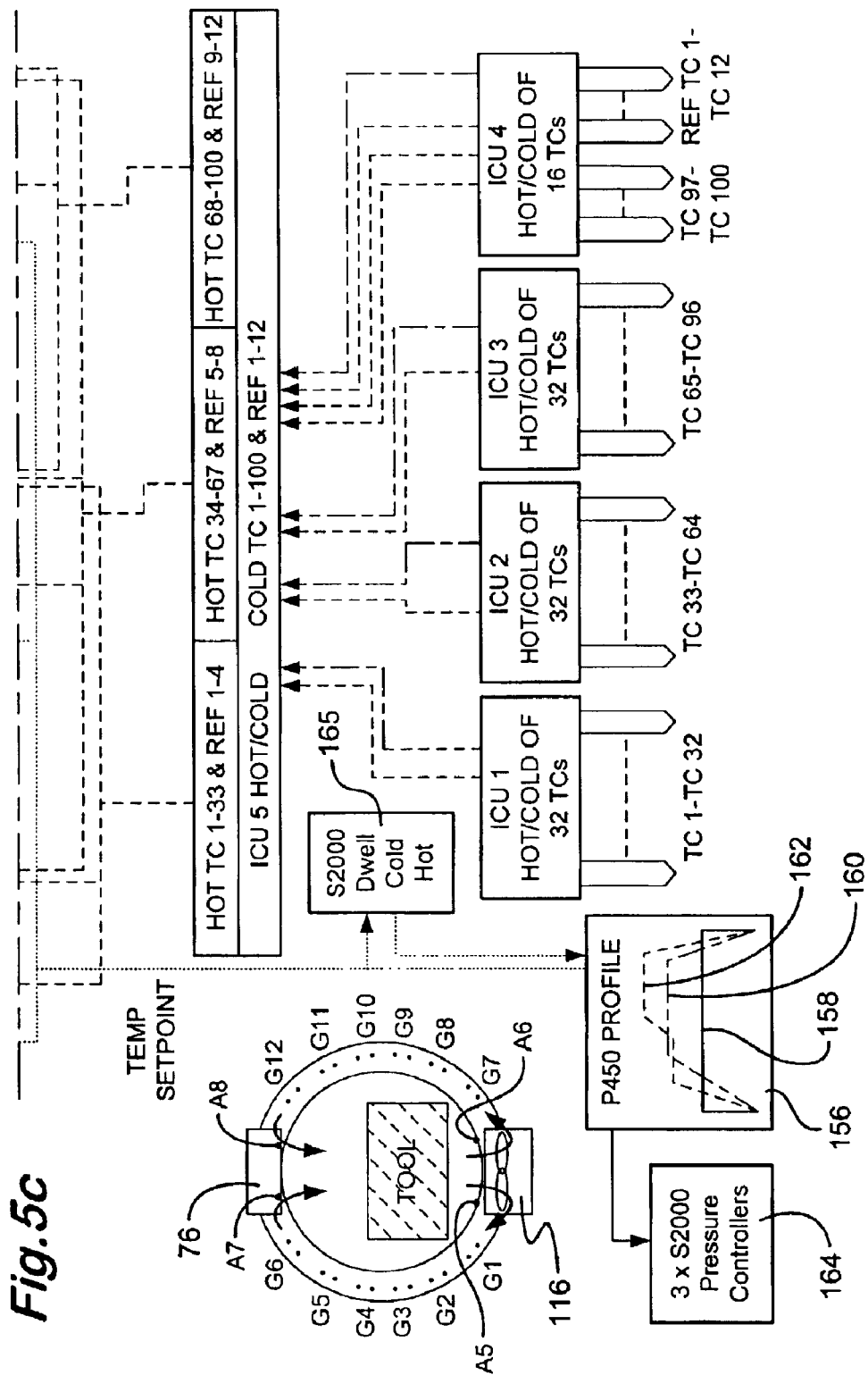

The layout of the autoclave of FIG. 3 is diagrammatically shown in FIG. 5, which is a schematic view of the autoclave and an associated control system. The segments 62, 64, 66 are heated by radiant tubes 110 and fired by gas burners 112 as described e.g. in EP-B-0176508 and EP-B-0333389. The radiant tubes are represented in the diagrammatic section that forms part of FIG. 5c as G1–G12, and are directed axially, each passing through three heating zones each defined by independently controllable coolers 74, 76, 78, 80, 82, 84, 88, 90, 92 and by independently controllable impellers 114, 116, 118; 120, 122, 124; and 126, 128, 130. The gas burners for each segment have associated thermocouples G1–G12 which measure the temperature of the circumferential air and pass signals to a respective one of segment heater logic units ICU 7, ICU 9 and ICU 11 that in turn pass command signals to progressive gas burner controllers 132, 134, 136 associated with the respective segments (cold<SP). The three heater logic units receive heat enable commands 138, 140, 142 from fan and cooler logic units ICU 6, ICU 8 and ICU 10 for the three segments.

In the first zone, thermocouples A1 and A2 measure the temperature of the flow exiting impeller 114, and thermocouples A3 and A4 measure the flow entering cooler unit 74 the difference providing a measure of the heat taken up by the load or during a cooling part of the cycle energy released from the load, the thermocouples occurring in pairs because of the bilobal flow pattern. In the second zone thermocouples A5 and A6 measure the temperature of air exiting impeller 116 and thermocouples A7 and A8 monitor the temperature of air entering cooler unit 76. In the third zone, thermocouples A9 and A10 monitor the temperature of air leaving impeller 118 and thermocouples A11 and A12 monitor the temperature of air entering cooler unit 78. Signals from the twelve thermocouples are supplied to the unit ICU6, ICU7 or ICU8 which in addition to providing gas burner command signals also provides command signals Z1, Z2, Z3 to proportional cooling valves 144, 146 and 148 (Hot>SP) and similar signals to friction heat inverters 150, 152, 154 (Hot±SP) for the impellers of each zone. Accordingly if the gas in any zone is sufficiently below the set point, then the gas burners 112 of the radiant tubes 1109 can be switched on. If the temperature of the gas in any zone is above the set point, cooling can be initiated, and adjusting inverter power for each zone can compensate fine deviations in gas temperature.

The operation of the autoclave depends not only on measurements of heating system temperature and of gas temperature but also on measurement of load (tool or workpiece) temperature. For that purpose, load sensor thermocouples 1–33 and reference thermocouples 1–4 are allocated to segment 62, load sensor thermocouples 34–67 and reference thermocouples 5–8 are allocated to segment 64 and load sensor thermocouples 68–100 and reference thermocouples 9–12 are allocated to segment 66. Logic units ICU 1–ICU 4 feed signals for the hottest and the coldest of groups of thermocouples that they monitor to temperature control logic ICU 5. In this way the temperature of the process mass (tooling+workpiece) may be sensed zone-wise and the control unit can respond both to deviations of the whole process mass from the intended temperature and also to deviations from the intended temperature within individual zones.

As shown at 156 (FIG. 5c), the processing cycle to be carried out by the autoclave which is stored at device 156 will normally include a relatively simple pressure cycle 158 that provides for pressurization of the autoclave, dwell at pressure and release of pressure on completion of the cooling phase of the treatment cycle. A workpiece processing cycle 160 that coincides with the pressure cycle has a predetermined rate of temperature rise, dwell time at the intended processing temperature and a predetermined rate of temperature return to ambient. The cycle of processing gas temperature 162 is usually more complex, with the gas temperature leading the workpiece temperature during the heating part of the cycle, and with a ratio between those temperatures being a factor that determines the coefficient of heat transfer. From device 156, information is supplied to pressure controllers 164 for the three segments, and temperature set points are supplied to air/load temperature ratio controllers 166, 168, 170.

If any of the workpiece or control thermocouples indicate too low a temperature, then logic ICU 5 (FIG. 5c) supplies information to dwell/cold/hold logic 165 which is also supplied with the temperature set-point and which may return a signal to device 156 to vary e.g. the air temperature set point. Device ICU 5 is also concerned with spread control. If one of the thermocouples in the group is at or near the required temperature while others are at too low a temperature, then the logic causes supply of additional heat to be reduced (Hold) until the temperature of the cold areas has caught up. If a thermocouple in any of the segments is hot, then a signal is sent to the ratio controller 166, 168 or 170 to reduce heating in the segment where the thermocouple in question is sited. The signal is passed both to the segment heater logic unit ICU 7, 9 or 11 and also to the fan and cooler logic units for the adjoining segments. Thus if one of the thermocouples 1–33 or one of the reference thermocouples 1–4 gives a HOT signal, then a signal is passed to the ratio controller 166 for segment 62 for reduction of gas burner heat and/or impeller friction heat and to pulse speed input of fan and cooler logic ICU 8 for adjoining segment 64 to adjust the friction heat developed any or all of the zones in that segment. Similarly, if one of the thermocouples 34–67 or one of the reference thermocouples 5–8 gives a HOT signal, then a signal is passed to the ratio controller 168 for segment 64 for reduction of gas burner heat and/or impeller friction heat and to pulse speed input of fan and cooler logic units ICU 6 and ICU 10 for adjoining segments 62 and 66 to adjust the friction heat developed any or all of the zones in those segments. Again, if one of the thermocouples 68–100 or one of the reference thermocouples 9–12 gives a HOT signal, then a signal is passed to the ratio controller 170 for segment 66 for reduction of gas burner heat and/or impeller friction heat and to pulse speed input of fan and cooler logic ICU 8 for adjoining segment 64 to adjust the friction heat developed any or all of the zones in that segment. The control circuit therefore enables a relatively coarse response to be carried out segment-wise to major low or high deviations of gas, tool or workpiece temperature, and more finely tuned zone-wise responses to smaller temperature fluctuations from the intended heat treatment cycle using zone-wise cooling, zone-wise adjustment of the rate of mass flow by change in impeller speed and zone-wise change in friction heat generation.

As indicated above load sensor couples TC-1 to TC-100 are provided may be positioned e.g. at the underside of the tool, and/or at the interface between the tool and the workpiece and/or to the free surface of the workpiece. The ability to control the friction heat supplied via the impellers on the basis of measured local tool temperature is a significant advantage of the invention. It has also been found that although the heat from the gas burners is important during heating to the required process temperature, when working at pressures of e.g. 7–15 bar the friction heat from the impellers can provide most if not all of the heat required to maintain the required stable temperature within the load space. A practical embodiment of the autoclave described above has been constructed by the applicants and has achieved a total spatial uniformity within a 5.5 meter diameter and a 40 meter length of ±1.2° C. immediately on installation, and with a tool in place has achieved a total spatial uniformity of ±1.8° C. The applicants expect to achieve even greater spatial uniformity when the autoclave is finally configured and tuned and in particular to achieve a spatial uniformity with a tool in place of ±1.0° C. or better.

Figure 6:
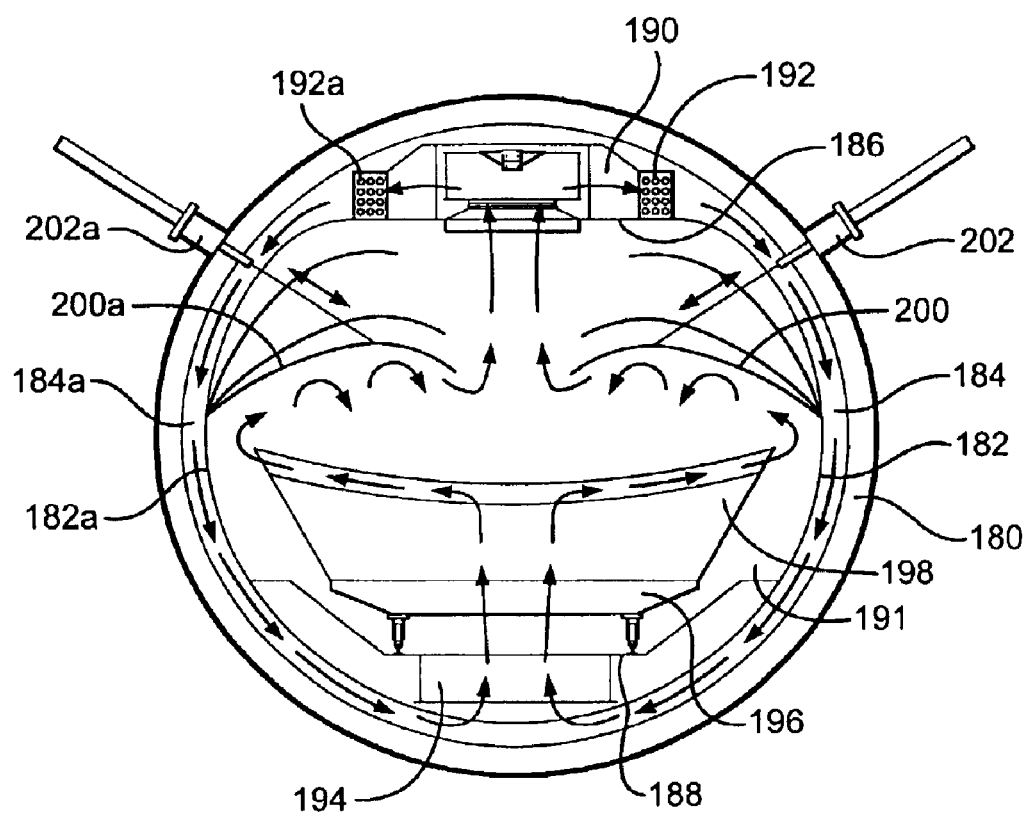
FIG. 6 is a view of another autoclave according to the invention in transverse section.

FIG. 6 is a cross-section of an alternative embodiment of an autoclave of the invention in which each zone is electrically heated with an overhead heater and cooled as required by a floor radiator, the flow of gas across the load chamber impinging onto a molding tool from its underside. One possible use of the autoclave is for the molding and curing of large panels of resin reinforced carbon fiber or other composite materials for use in airliners. The autoclave has sidewall 180 and inner walls 182, 182a defining passages 184, 184a for circumferential flow of heating gas together with a ceiling 186 and a floor 188. An impeller 190 brings about flow of gas from load space 191 through electrical heaters 192, 192a and through passages 184, 184a to radiator 194 which contains cooling elements and from which the gas returns to the load space 191. Gas entering the load space passes through trolley 196 and tool 198 so that it impinges on the underside of the molding surface of the tool. The panel to be molded is on the upper surface of the tool and is of negligible thickness, and it has been omitted for the sake of clarity. The upper face of the panel may also need to be molded e.g. because it has one or more upstanding integrally formed ribs, and for that purpose the carbon fiber lay-up may be covered with a second part of the tool, also omitted for clarity. Gas flows along the underside of the tool towards the periphery of the autoclave as shown by the arrows, and is returned towards the tool so as to heat the upper mold part that rests on the carbon fiber lay-up by means of movable baffles 200, 200a whose positions are adjustable from outside the autoclave by actuators 202, 202a. A gap between the baffles 200, 200a permits the gas to return to the impeller 190 as shown. The baffles 200, 200a reduce the volume of gas above the tool 198, with the consequences that the velocity of the gas and hence its coefficient of heat transfer to the tool is increased.

In order to minimize variations in load temperature axially of the autoclave, it may be desirable to provide means for conveying gas axially from one zone to the other. In order to achieve such conveyance, a cyclically varying pattern of circulation conditions may be applied to at least one zone that shifts axially of the autoclave. For example, adjacent zones may vary in temperature individually and cyclically as in FIGS. 7a and 7b. Alternatively a zone of high temperature may be followed by two zones of lower temperature as in FIGS. 8a–8c. The cyclical variation in temperature from zone to zone may conveniently be achieved by adjustment of the friction heat of the impellers 114–130 via logic units ICU 6–ICU 10 and inverters 150–154.

Various modifications may be made to the illustrated embodiments without departing from the invention.

For example, the drawings have illustrated cases where firstly the heater is in the ceiling and the cooling radiators are in the floor, gas flowing downwardly through the load space to provide hot air impingement from above, and secondly the cooling radiators are positioned in the ceiling and the hot air is ducted to rise from under the floor into the load space through which it flows upwardly into the base of the tooling to provide hot air impingement from below. Although these airflow directions may often be convenient, the direction of airflow is arbitrary and could for example be side to side, the heater and cooling radiator being correspondingly placed. Furthermore, the flow can be established using more than one impeller per zone, the fans being located above and below the workpiece and tool or to either side of the workpiece and tool to provide hot air imingement from above and below or from opposed sides.

Figure 10:
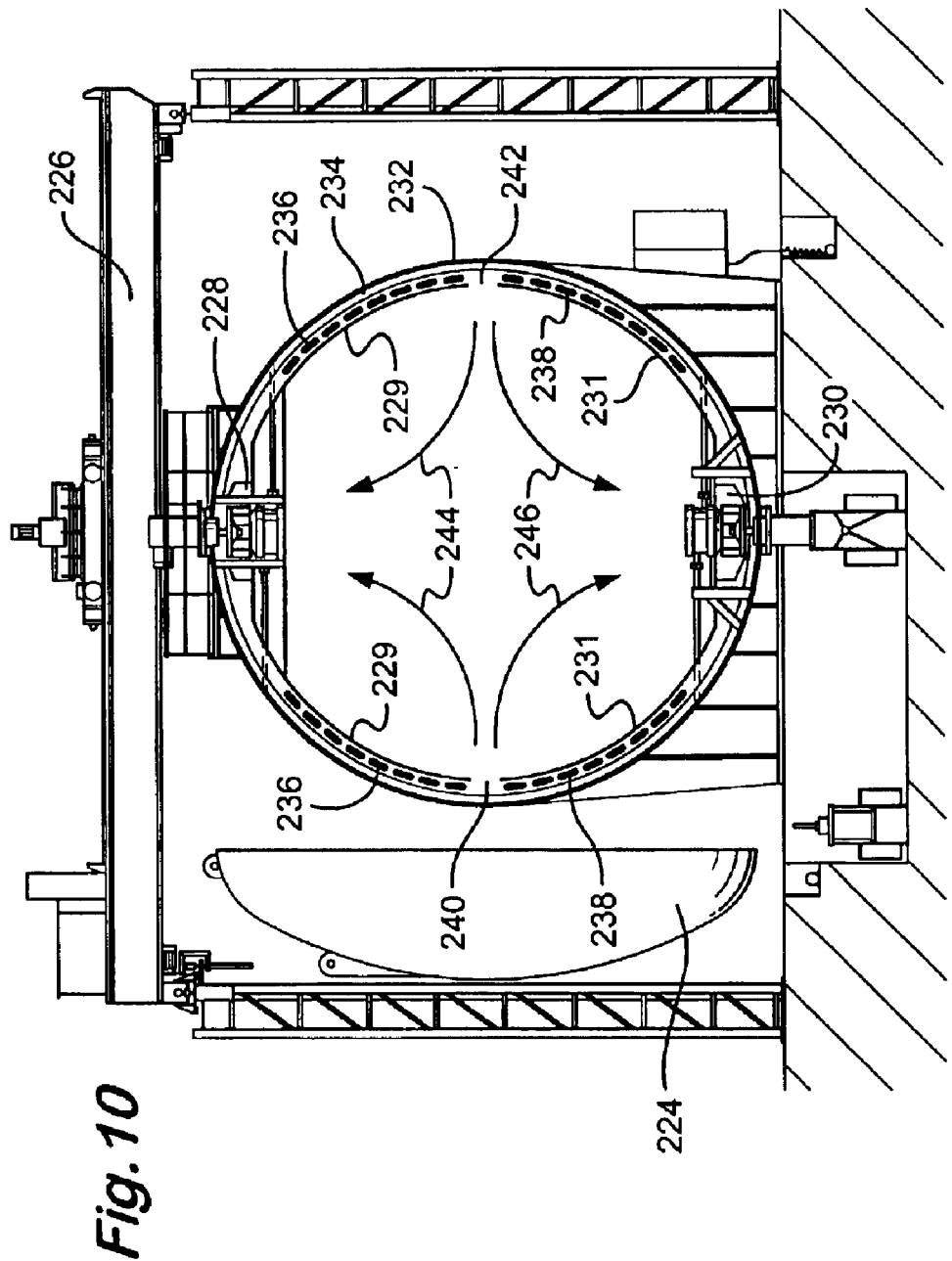

In FIG. 9 there is shown an autoclave having a single large vessel rather than three vessels joined in series, and having an aspect ratio of less than 3. One end 222 of the vessel is closed and the other end is closable by a door 224 which can be manipulated by gantry crane 226. The autoclave is divided longitudinally into heating zones as in the previous embodiments, and a cross-section of one such zone appears in FIG. 10. A pair of impellers 228, 230 are located 180° apart within the shell 232 which is internally insulated by insulation 234 e.g. of rockwool. Sidewalls 229, 231 separate the load space from heaters 236, 238 which occur in two banks each associated with a respective impeller. Also associated with each impeller is a cooler (not shown) for forced cooling of the gas within the autoclave during the cooling phase of each tratment cycle. The walls 229 and 231 are spaced apart at an equatorial region of the autoclave to define therebetween openings 240, 242 for jets of air into the load space as shown by arrows 244, 246. These jets can impinge from opposite directions onto a workpiece and tool when present in the load space, and a gas flow can be eatablished which is 4-lobal when viewed in transverse cross-section. Such a multiple zone arrangement may be desirable where it is required to maintain a high level of mass air flow whilst retaining motors of sensible proportions. The speeds of the impellers 228 and 230 may be controlled individually by respective control means to provide, if desired, not only separately controllable heating and cooling for each individual zone along the autoclave but also separately controllable heating and cooling for individual regions within each such zone.

Figure 11:
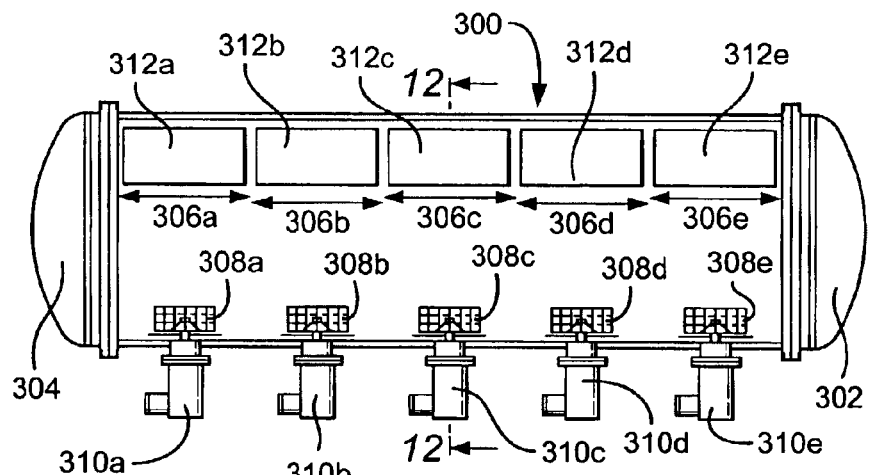
FIGS. 11 and 12 are respectively a diagrammatic partly sectioned side view and a view in transverse section of a yet further autoclave according to the invention.
Figure 12:
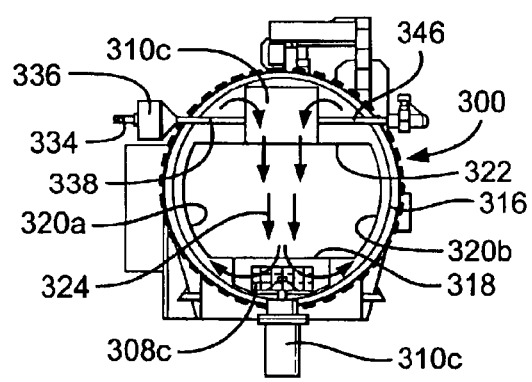
Figure 14:
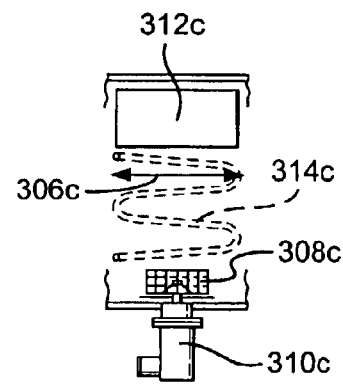
FIG. 14 is a view of one of the heating and cooling zones of the autoclave showing one form of cooler.

FIGS. 11 and 12 show a further autoclave according to the invention in which a generally cylindrical shell 300 is closed at opposed ends by doors 302, 304 and has an internal load space divided longitudinally into five independently controllable heating zones 306a–306e. Each heating zone has an associated impeller 308a–308e driven by motor 310a–310e, first heat exchanger 312a–312e for heating the gas in the load space by gaseous combustion products and second heat exchanger 314c (FIG. 14; the second heat exchangers are not shown in FIG. 11) for cooling the gas in the load space by contact with water circulating through cooling pipes. The gas in each zone is heated by heat exchange with the combustion gas associated with the first heat exchanger and by the friction heat imparted by the impeller and may be cooled both during the heating part of the treatment cycle to assist temperature control of the gas in that zone and during the cooling part of the treatment cycle to speed up return to ambient temperature. The control system may be generally as described with reference to FIGS. 5a–5c, and in particular it may provide for feedback control of the friction heat generated in each zone by respective impellers 308a–308e in accordance with temperatures sensed by thermocouples attached to the load within the autoclave. The provision of doors 302, 304 at each end of the autoclave shell enables the autoclave to be positioned within a product flow line so that the untreated products can enter at one end of the autoclave and be discharged from the other end, the non-axial gas flow of the invention enabling the doors of the autoclave to be free of impellers and drive motors for the impellers which would otherwise add weight and bulk. As is apparent in FIG. 12, the vessel 300 is lined with one or more layers of thermally insulating material 316, and the load space is defined by floor 318, sidewalls 320a, 320b and ceiling 322, an opening in the floor 318 leading to the impeller 308c and an opening in the ceiling 322 leading from the heat exchanger 310c into the load space. Operation of the impeller establishes a toroidal circulation of gas from the load space between the sidewalls 320a, 320b and then returning from the first heat exchanger 310c into the load space as indicated by arrows 324.

Figure 13:
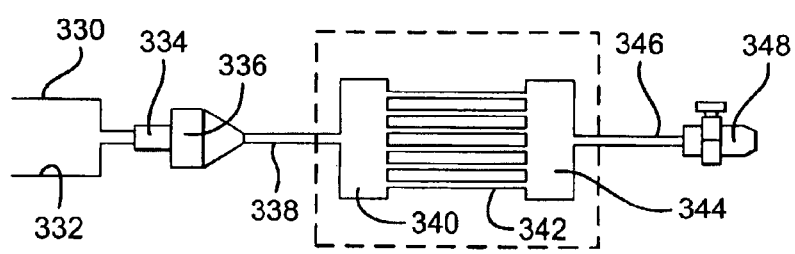
FIG. 13 is a circuit diagram of one of the burner and heat exchanger units that form part of the autoclave.

Referring to FIGS. 12 and 13 gas in line 330 and air in line 332 are fed to burner 334 in combustion space 336. The products of combustion are fed via line 338 to manifold 340 of heat exchange pipe array 342. The gas from array 342 after heat exchange with the gas in the combustion space is extracted via manifold 344 and line 346 to optional fan 348 and then discharged. Typically the gas mixture fed to burner 344 is about 300% over-aerated to moderate the temperature of the products of combustion passing through the heat exchanger tubes and hardness and embrittlement of the heat exchanger tubes. Depending on the heat transfer characteristics required in any particular installation, the tubes of the array 342 may be plain or may carry fins, as also may be tubes of the second heat exchanger. The cooler for each zone may be one or more water-filled cooling tube arrays located beneath the floor 318 on the upstream or downstream side of the impeller 308, it may be a serpentine tube 314c (plain or with cooling fins) located between the walls 320a, 320b and the insulation 316 or it may be located in the space above the ceiling 322 upstream or downstream of the heat exchanger 312a–312e.

What is claimed is:

1. An autoclave for heat-treating an elongated load, that differs in mass, shape or cross-section alone its length, said autoclave comprising:
   a shell defining a pressurizable heating chamber;
   means within the shell defining a load space;
   at least one door for closure of the heating chamber and for permitting entry of loads into and discharge of loads from the load space;
   means for heating the gas within the load space
   a plurality of impellers and respective driving means spaced apart at intervals along the heating chamber each non-axial circulation of gas in a respective zone or zones of said load space; and
   temperature control means having inputs for thermocouples associated with the load and arranged to adjust the heat imparted to the load in the zone or zones individually to heat the load at different temperatures along its length and/or at different speeds of gas circulation so that the temperature of the load as a whole is raised at a uniform rate.

2. The autoclave of claim 1, wherein the shell has doors at opposed ends.

3. The autoclave of claim 1, wherein the shell has a door at one end and a wall at the opposite end.

4. The autoclave of claim 1, wherein the shell has a lining of thermally insulating material.

5. The autoclave of claim 1, further comprising walls within the shell that at least partly conform to and are spaced from said shell to define the load space and space for gas circulation surrounding the load space, wherein each zone has at least a first opening through the walls for flow of gas from the load space into the surrounding space and at least a second opening through the walls for return of gas from the surrounding space into the load space.

6. The autoclave of claim 5, wherein each zone has a first opening through the walls for flow of gas from the load space into the surrounding space and a second opening through the walls for return of gas from the surrounding space into the load space for establishment of a generally toroidal gas circulation in said zone.

7. The autoclave of claim 5, wherein each zone has a first impeller having an inlet connected to the first opening for receiving gas from the load space, the impeller having oppositely facing first and second outlets opening into the gas circulation space and directed generally traversely of the shell for causing the gas to circulate along opposite sides of the shell towards the second opening.

8. The autoclave of claim 1, wherein the or each impeller comprises a centrifugal fan.

9. The autoclave of claim 1, wherein the heating means comprises a heater for each zone for independently heating gas circulating in that zone.

10. The autoclave of claim 9, wherein the heating means is gas-fired.

11. The autoclave of claim 9, wherein the heating means is electrical.

12. The autoclave of claim 1, wherein the heating means comprises a heater that is common to a plurality of zones.

13. The autoclave of claim 12, wherein heating means comprises at least one radiant tube heater.

14. The autoclave of claim 13, wherein the heater is gas-fired.

15. The autoclave of claim 1, further comprising cooling means for cooling gas circulating in said zone.

16. The autoclave of claim 1, wherein the impeller and driving means for one or more zones are arranged to impart friction heat adjustably to the gas in an individual zone or individual zones.

17. The autoclave of claim 16, further comprising temperature control means having inputs for thermocouples within said load space and arranged to adjust the friction heat imparted in the zone or zones in accordance with the inputs from said thermocouples.

18. The autoclave of claim 16, wherein the temperature control means has inputs for thermocouples associated with the load and is arranged to adjust the friction heat imparted in the zone or zones individually in accordance with inputs from said load thermocouples.

19. The autoclave of claim 1, which has an aspect ratio of more than 3.

20. The autoclave of claim 19, wherein the load space has a volume of more than 250 cubic meters.

21. An autoclave for heat-treating a load, said autoclave comprising:
    a shell defining a pressurizable heating chamber;
    at least one door for closure of the heating chamber and for permitting entry of loads into and discharge of loads from the load space;
    means for heating the gas within the load space;
    a plurality of impellers and respective driving means spaced apart at intervals along the heating chamber each for non-axial circulation of gas in a respective zone or zones of said load space; and
    walls within the shell that at least partly conform to and are spaced from said shell to define the load space and space for gas circulation surrounding the load space, wherein each zone has first and third openings through the walls for flow of gas from the load space into the surrounding space and second and fourth openings through the walls for return of gas from the surrounding space into the load space, the first and third openings and the second and fourth openings being opposed and a line passing through the first and third openings being directed generally at right angles to a line passing through the second and fourth openings for establishment of a generally tetra lobal gas circulation in said zone.

22. An autoclave for heat-treating a load, said autoclave comprising:
    a shell defining a pressurizable heating chamber;
    means within the shell defining a load space;
    at least one door for closure of the heating chamber and for permitting entry of loads into and discharge of loads from the load space;
    means for heating the gas within the load space;
    a plurality of impellers and respective driving means spaced apart at intervals alone the heating chamber each for non-axial circulation of gas in a respective zone or zones of said load space; and
    control means adapted to create differential conditions in at least one zone in a time-varying pattern, thereby to transfer gas axially between zones.

23. An autoclave for heat-treating a load, said autoclave comprising:
    a shell defining a pressurizable heating chamber;
    means within the shell defining a load space;
    at least one door for closure of the heating chamber and for permitting entry of loads into and discharge of loads from the load space;
    means for heating the gas within the load space;
    a plurality of impellers and respective driving means spaced apart at intervals alone the heating chamber each for non-axial circulation of gas in a respective zone or zones of said load space; and
    at least one gas deflection means in the load space for varying the velocity of gas adjacent to the load.

24. The autoclave of claim 23, further comprising actuator means connected to said gas deflection means for adjustment of the position thereof from the exterior of said shell.

25. An autoclave for heat treating a load having a load space, a side wall through which heating gas can circulate, and means for circulating the gas, wherein means is provided for establishing a gas circulation that is tetra-lobal.

26. The original of claim 25, wherein in at least one zone along longitudinal axis of the autoclave first and second impellers are disposed, when the autoclave is viewed in section, at the 0° and 180° positions and has discharge outlets defined by discontinuities in an inner load-space defining wall at the 90° and 270° positions so that first and second inward flows of heated air can be produced which can impinge one a workpiece from opposite directions.

27. A method of forming an elongated shaped panel, which method comprises:
    producing a load by contacting said panel with a forming tool for shaping the panel;
    heat treating said load in an autoclave of volume more than 250 cubic meters and of load space aspect ratio more than 3, the longest dimension of said panel being directed generally parallel to the axis of said autoclave, the panel and the forming tool extending along a major portion of the internal space of the autoclave and the thermal characteristics of the load varying with position along the load, the autoclave having a plurality of gas circulation means spaced along its length and each producing a zone for circulation of heating gas that is caused to impinge non-axially onto the load and that is caused to heat the load at different temperatures along its length and or at different speeds of gas circulation so that the temperature of the load as a whole is raised at a uniform rate.

28. The method of claim 27, wherein the panel includes curable carbon-fiber-based material.

29. The method of claim 28, wherein:
the panel comprises resin reinforced carbon fiber or other composite material for use in an airliner and is large but of negligible thickness compared to the forming tool;
the panel is on the upper surface of the forming tool; and heating gas impinges on the underside of the tool.

30. The method of claim 27, wherein panel is of metal and the heat treatment comprises creep forming.

31. The method of claim 30, wherein the panel is on the upper surface of the forming tool and the heating gas is directed downwardly towards the panel and the forming tool.

32. The method of claim 27, further comprising measuring the temperature of the panel and the tool zone-wise and responding to deviation of the tool and panel from the intended temperature and to deviations within individual zones.

33. The method of claim 27, wherein the autoclave is of volume more than 500 cubic meters.

34. The method of claim 27, wherein the autoclave is of volume more than 750 cubic meters.

35. The method of claim 27, wherein the autoclave has an aspect ratio of more than 5.

36. The method of claim 27, wherein the autoclave has an aspect ratio of about 7.

37. The method of claim 27, wherein said autoclave uses a plurality of impellers and respective drivers spaced apart at intervals along the heating chamber each for non-axial circulation of gas in a respective zones of said load space.

38. The method of claim 37, wherein the autoclave has walls within a shell thereof that at least partly conform to and are spaced from said shell to define the load space and space for gas circulation surrounding the load space, wherein each zone has at least a first opening through the walls for flow of gas from the load space into the surrounding space and at least a second opening through the walls for return of gas from the surrounding space into the load space.

39. The method of claim 38, wherein each zone has a first opening through the walls for flow of gas from the load space into the surrounding space and a second opening through the walls for return of gas from the surrounding space into the load space for establishment of a generally toroidal gas circulation in said zone.

40. The method of claim 27, wherein the impeller and driver for one or more zones are used to impart friction heat adjustably to the gas in an individual zone or individual zones.

41. The method of claim 40, wherein the load space includes a temperature controller has inputs for thermocouples and is used to adjust the friction heat imparted in the zone or zones in accordance with the inputs from said thermocouples.

42. The method of claim 41, wherein the temperature controller has inputs for thermocouples associated with the load and is used to adjust the friction heat imparted in the zone or zones individually in accordance with inputs from said load thermocouples.

43. The method of claim 27, wherein the panel is a large aircraft wing panel.

44. An autoclave for heat-treating an elongated load that differs in mass, shape or cross-section along its length, said autoclave comprising:
a shell defining a pressurizable heating chamber;
at least one inner wall within the shell to define a load space;
at least one door for closure of the heating chamber and for permitting entry of loads into and discharge of loads from the load space;
at least one heater to heat a gas within the load space;
a plurality of impellers and respective motors spaced apart at intervals along the heating chamber each non-axial circulation of gas in a respective zone or zones of said load space; and
temperature control logic units having inputs for thermocouples associated with the load and arranged to adjust the heat imparted to the load in the zone or zones individually to heat the load at different temperatures along its length and/or at different speeds of gas circulation so that the temperature of the load as a whole is raised at a uniform rate.

45. The autoclave of claim 44, wherein the at least one heater includes a gas-fired heater.

46. The autoclave of claim 44, wherein the at least one heater includes an electric heater.

47. The autoclave of claim 44, wherein the at least one heater includes a friction heater.

48. An autoclave for heat-treating a load, said autoclave comprising:
a shell defining a pressurizable heating chamber;
at least one door for closure of the heating chamber and for permitting entry of loads into and discharge of loads from the load space;
at least one heater for heating the gas within the load space;
a plurality of impellers and respective motors spaced apart at intervals along the heating chamber each for non-axial circulation of gas in a respective zone or zones of said load space; and
walls within the shell that at least partly conform to and are spaced from said shell to define the load space and space for gas circulation surrounding the load space, wherein each zone has first and third openings through the walls for flow of gas from the load space into the surrounding space and second and fourth openings through the walls for return of gas from the surrounding space into the load space, the first and third openings and the second and fourth openings being opposed and a line passing through the first and third openings being directed generally at right angles to a line passing through the second and fourth openings for establishment of a generally tetra lobal gas circulation in said zone.

49. The autoclave of claim 48, wherein the at least one heater includes a gas-fired heater.

50. The autoclave of claim 48, wherein the at least one heater includes an electric heater.

51. An autoclave for heat-treating an elongated load that differs in mass, shape or cross-section along its length, said autoclave comprising:

a shell defining a pressurizable heating chamber;

a load space within the shell;

at least one door for closure of the heating chamber and for permitting entry of loads into and discharge of loads from the load space;

at least one heater to heat a gas within the load space;

a plurality of impellers and respective motors spaced apart at intervals along the heating chamber each non-axial circulation of gas in respective zones of said load space; and at least one logic unit adapted to create differential temperature conditions in at least one zone in a time-varying pattern, thereby to transfer gas axially between zones.

52. The autoclave of claim 51, wherein the at least one heater is at least one impeller providing friction heat and the at least one logic unit is adapted to create differential temperature conditions by adjustment of friction heat from the impellers.

53. The autoclave of claim 51, wherein the autoclave further includes at least one cooling unit, and wherein the at least one logic unit is adapted to create differential temperature conditions by controlling the cooling unit.

54. An autoclave for heat-treating an elongated load that differs in mass, shape or cross-section along its length, said autoclave comprising:

a shell defining a pressurizable heating chamber;

a load space within the shell;

at least one door for closure of the heating chamber and for permitting entry of loads into and discharge of loads from the load space;

at least one heater to heat a gas within the load space;

a plurality of impellers and respective motors spaced apart at intervals along the heating chamber each non-axial circulation of gas in respective zones of said load space; and at least one gas deflector in the load space to vary a velocity of gas adjacent the load.

55. The autoclave of claim 54, wherein the at least one gas deflector includes movable baffles.

56. The autoclave of claim 54, wherein the at least one gas deflector includes a forming tool.

57. The autoclave of claim 54, wherein the load space includes an inner load space wall and wherein the at least one gas deflector includes at least one discontinuity in the inner load space wall.

* * * * *